United States Patent
Yonekawa

(10) Patent No.: US 12,243,320 B2
(45) Date of Patent: Mar. 4, 2025

(54) INFORMATION PROCESSING METHOD, PROGRAM, AND INFORMATION PROCESSING APPARATUS

(71) Applicant: Sony Semiconductor Solutions Corporation, Kanagawa (JP)

(72) Inventor: Haruyoshi Yonekawa, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 478 days.

(21) Appl. No.: 17/442,075

(22) PCT Filed: Mar. 17, 2020

(86) PCT No.: PCT/JP2020/011601
§ 371 (c)(1),
(2) Date: Sep. 22, 2021

(87) PCT Pub. No.: WO2020/203241
PCT Pub. Date: Oct. 8, 2020

(65) Prior Publication Data
US 2022/0172484 A1 Jun. 2, 2022

(30) Foreign Application Priority Data
Mar. 29, 2019 (JP) .................. 2019-065378

(51) Int. Cl.
*G06V 20/56* (2022.01)
*G01S 13/89* (2006.01)
(Continued)

(52) U.S. Cl.
CPC .............. *G06V 20/56* (2022.01); *G01S 13/89* (2013.01); *G06N 3/08* (2013.01); *G06V 10/82* (2022.01)

(58) Field of Classification Search
CPC ........ G06V 20/56; G06V 10/82; G06V 10/40; G06V 10/764; G06V 20/58; G06V 10/44;
(Continued)

(56) References Cited

U.S. PATENT DOCUMENTS

2016/0321540 A1 11/2016 Towal
2017/0169313 A1* 6/2017 Choi ...................... G06V 10/82
(Continued)

FOREIGN PATENT DOCUMENTS

EP 3289528 A 3/2018
EP 3627931 A1 3/2020
(Continued)

OTHER PUBLICATIONS

Written Opinion and English translation thereof mailed Jun. 9, 2020 in connection with International Application No. PCT/JP2020/011601.
(Continued)

*Primary Examiner* — Chan S Park
*Assistant Examiner* — Daniel C Chang
(74) *Attorney, Agent, or Firm* — Wolf, Greenfield & Sacks, P.C.

(57) ABSTRACT

The present technology relates to an information processing method, a program, and an information processing apparatus capable of analyzing a learning situation of a model using a neural network.
In step S1, feature data that numerically represents a feature of a feature map generated from input data in a model using a neural network is generated. In step S2, analysis data based on the feature data of a plurality of the feature maps is generated. The present technology can be applied to, for example, a system that recognizes a vehicle in front of a vehicle.

14 Claims, 25 Drawing Sheets

(51) Int. Cl.
*G06N 3/08* (2023.01)
*G06V 10/82* (2022.01)

(58) Field of Classification Search
CPC .......... G06V 20/64; G01S 13/89; G06N 3/08; G06N 3/045; G06N 20/00; G06N 3/02; G06N 3/04; G06F 18/2413; G06T 2207/20081; G06T 2207/20084; G06T 2207/30248; G06T 2207/30252; G06T 7/00; G06T 7/20
See application file for complete search history.

(56) References Cited

U.S. PATENT DOCUMENTS

| | | | |
|---|---|---|---|
| 2018/0365794 A1* | 12/2018 | Lee | G06N 3/063 |
| 2019/0026588 A1 | 1/2019 | Ryan | |
| 2020/0211219 A1* | 7/2020 | Yamazaki | G01S 17/87 |
| 2021/0232848 A1* | 7/2021 | Wang | G06N 3/045 |

FOREIGN PATENT DOCUMENTS

| | | |
|---|---|---|
| JP | H05-61976 | 3/1993 |
| JP | 2018-520404 | 7/2018 |
| WO | WO-2017192889 A1 | 11/2017 |
| WO | WO 2018/165753 A1 | 9/2018 |
| WO | WO-2018212606 A1 | 11/2018 |
| WO | WO-2018230832 A1 | 12/2018 |

OTHER PUBLICATIONS

International Preliminary Report on Patentability and English translation thereof mailed Oct. 14, 2021 in connection with International Application No. PCT/JP2020/011601.

Extended European Search Report issued Apr. 4, 2022 in connection with European Application No. 20784531.4.

XP055566692, Matthew D. Zeiler et al: "Visualizing and Understanding Convolutional Networks", in: "Advances in Databases and Information Systems", Jan. 1, 2014, Springer International Publishing, Cham 032682, ISBN: 978-3-319-10403-4. vol. 8689. pp. 818-833. DOI:10.1007/978-3-319-10590-1 53.

International Search Report and English translation thereof mailed Jun. 9, 2020 in connection with International Application No. PCT/JP2020/011601.

Zeiler et al., Visualizing and Understanding Convolutional Networks. European Conference on Computer Vision (ECCV). 2014. p. 818-833.

* cited by examiner

FIG. 8

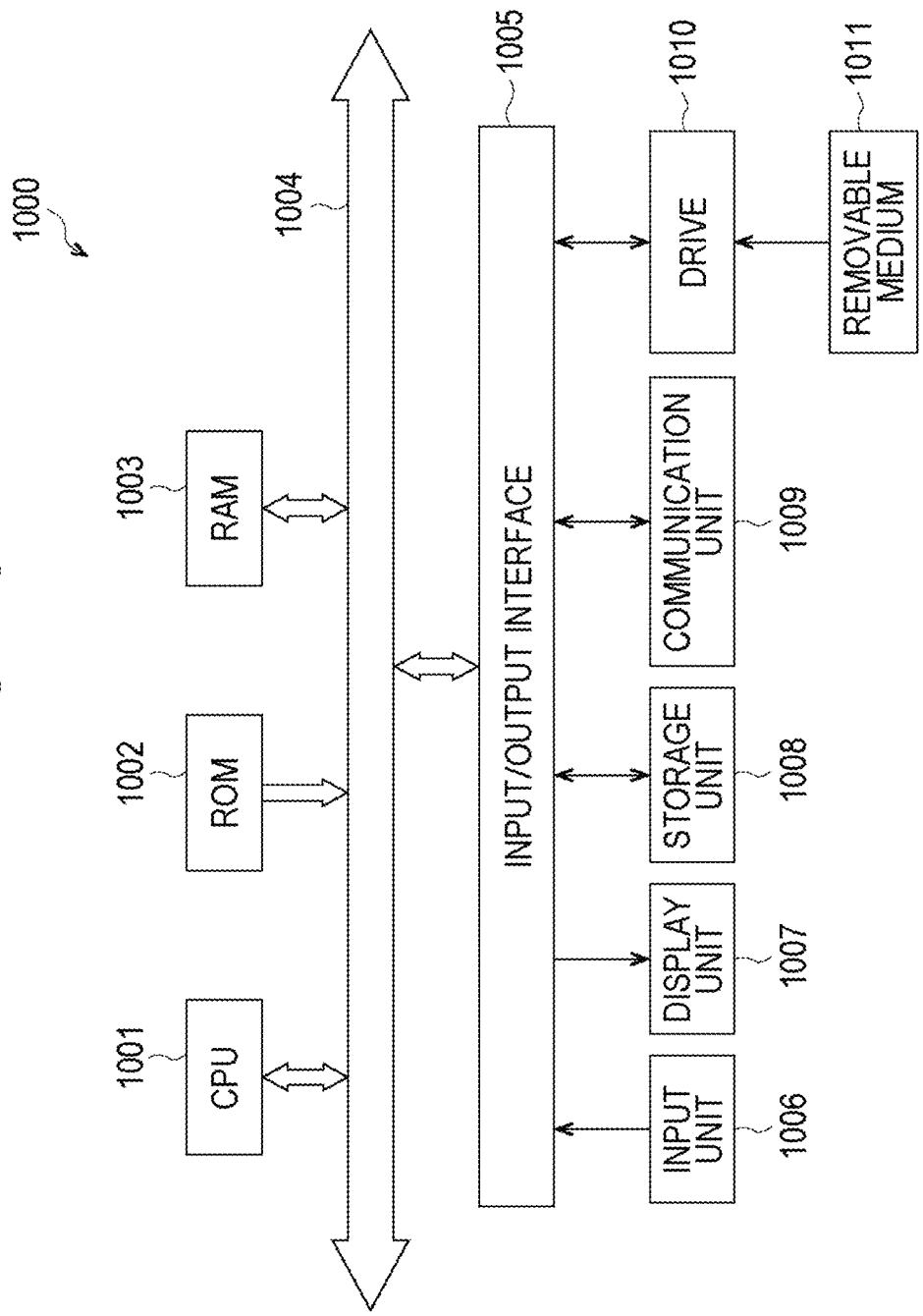

INFORMATION PROCESSING METHOD, PROGRAM, AND INFORMATION PROCESSING APPARATUS

CROSS-REFERENCE TO RELATED APPLICATIONS

This application claims the benefit under 35 U.S.C. § 371 as a U.S. National Stage Entry of International Application No. PCT/JP2020/011601, filed in the Japanese Patent Office as a Receiving Office on Mar. 17, 2020, which claims priority to Japanese Patent Application Number JP2019-065378, filed in the Japanese Patent Office on Mar. 29, 2019, each of which is hereby incorporated by reference in its entirety.

TECHNICAL FIELD

The present technology relates to an information processing method, a program, and an information processing apparatus, and particularly relates to an information processing method, a program, and an information processing apparatus suitable for use in a case of analyzing a model using a neural network.

BACKGROUND ART

Conventionally, a neural network is used in an image pattern recognition device (see, for example, Patent Document 1).

CITATION LIST

Patent Document

Patent Document 1: Japanese Patent Application Laid-Open No. H5-61976

SUMMARY OF THE INVENTION

Problems to be Solved by the Invention

Meanwhile, it is desired to be able to analyze a learning situation of a model using a neural network.

The present technology has been made in view of such a situation, and enables analysis of a learning situation of a model using a neural network.

Solutions to Problems

An information processing method according to one aspect of the present technology includes: a feature data generation step of generating feature data that numerically represents a feature of a feature map generated from input data in a model using a neural network; and an analysis data generation step of generating analysis data based on the feature data of a plurality of the feature maps.

A program according to one aspect of the present technology causes a computer to execute processing including: a feature data generation step of generating feature data that numerically represents a feature of a feature map generated from input data in a model using a neural network; and an analysis data generation step of generating analysis data based on the feature data of a plurality of the feature maps.

An information processing apparatus according to one aspect of the present technology includes: a feature data generation unit that generates feature data that numerically represents a feature of a feature map generated from input data in a model using a neural network; and an analysis data generation unit that generates analysis data based on the feature data of a plurality of the feature maps.

In one aspect of the present technology, feature data that numerically represents a feature of a feature map generated from input data in a model using a neural network is generated, and analysis data based on the feature data of a plurality of the feature maps is generated.

BRIEF DESCRIPTION OF DRAWINGS

FIG. 8 is a diagram illustrating an example in which feature maps are arranged two-dimensionally.
FIG. 25 is a diagram illustrating a configuration example of a computer.

MODE FOR CARRYING OUT THE INVENTION

Hereinafter, a mode for carrying out the present technology will be described. The description will be given in the following order.
1. Embodiment
2. Case Example of Analysis of Learning Situation
3. Modified Examples
4. Others 1. Embodiment First, an embodiment of the present technology will be described with reference to FIGS. 1 to 15.
<Configuration Example of Vehicle Control System 100>

Figure 1:
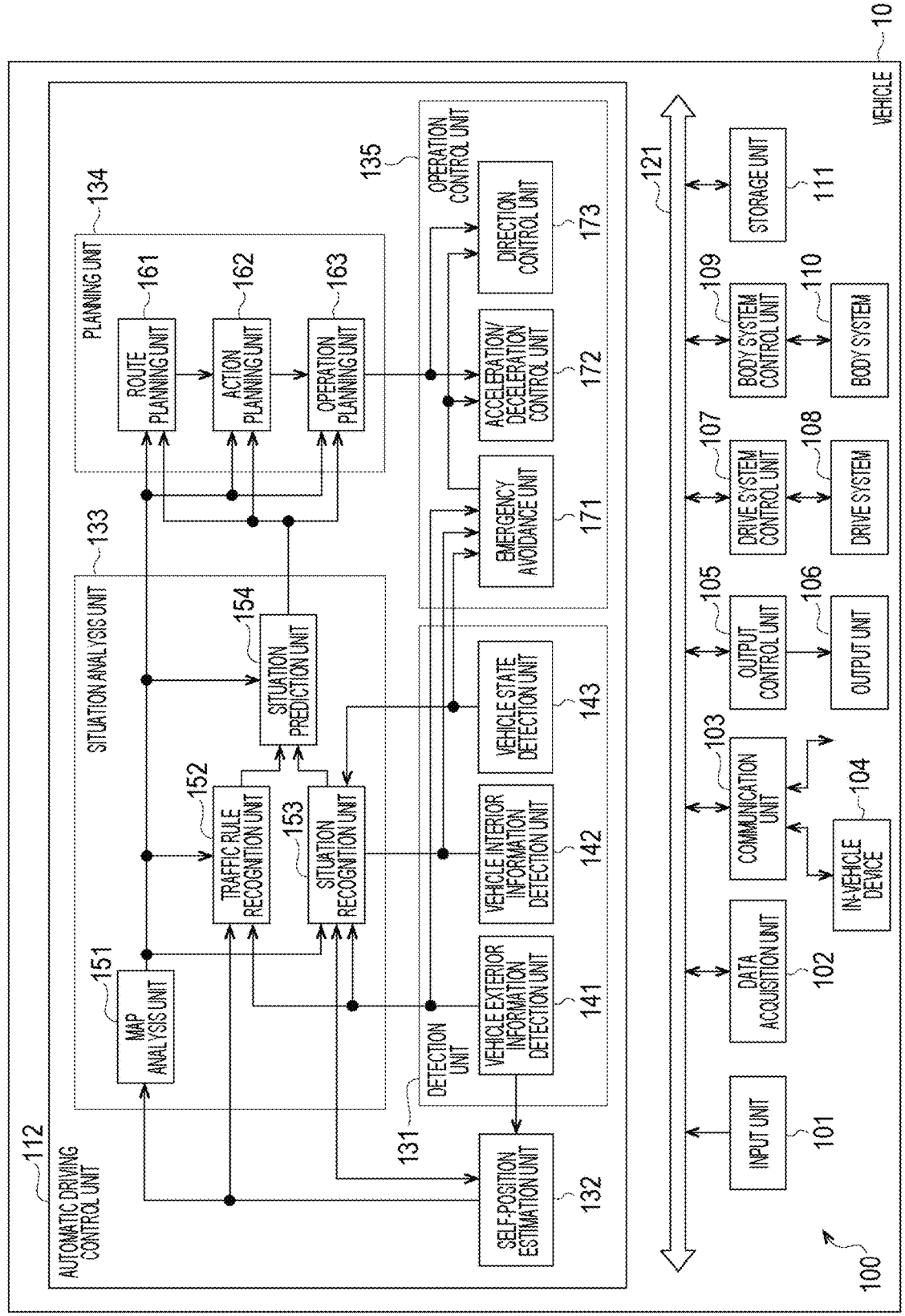
FIG. 1 is a block diagram illustrating a configuration example of a vehicle control system.

FIG. 1 is a block diagram illustrating a configuration example of schematic functions of a vehicle control system 100 which is an example of a moving body control system to which the present technology can be applied.

Note that, hereinafter, in a case where a vehicle 10 provided with the vehicle control system 100 is distinguished from other vehicles, it is referred to as a host vehicle or a host car.

The vehicle control system 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, a bus, a vehicle-mounted communication network conforming to any standard such as a controller area network (CAN), a local interconnect network (LIN), a local area network (LAN), FlexRay (registered trademark), and the like. Note that there is also a case where the units of the vehicle control system 100 are directly connected to each other without the communication network 121.

Note that, hereinafter, in a case where each unit of the vehicle control system 100 performs communication via the communication network 121, description of the communication network 121 will be omitted. For example, in a case where the input unit 101 and the automatic driving control unit 112 perform communication via the communication network 121, it is simply described that the input unit 101 and the automatic driving control unit 112 perform communication.

The input unit 101 includes a device used by a passenger for inputting various data, instructions, and the like. For example, the input unit 101 includes an operation device such as a touch panel, a button, a microphone, a switch, a lever, and the like, and an operation device and the like that can be input by a method other than a manual operation such as voice, gesture, and the like. Furthermore, for example, the input unit 101 may be a remote control device using infrared rays or other radio waves, or an external connection device such as a mobile device, a wearable device, and the like corresponding to an operation of the vehicle control system 100. The input unit 101 generates an input signal on the basis of data, instructions, and the like input by the passenger, and supplies the input signal to each unit of the vehicle control system 100.

The data acquisition unit 102 includes various sensors and the like that acquire data used for processing of the vehicle control system 100, and supplies the acquired data to each unit of the vehicle control system 100.

For example, the data acquisition unit 102 includes various sensors for detecting a state and the like of the host vehicle. Specifically, for example, the data acquisition unit 102 includes a gyro sensor, an acceleration sensor, an inertial measurement unit (IMU), and a sensor and the like for detecting an operation amount of an accelerator pedal, an operation amount of a brake pedal, a steering angle of a steering wheel, an engine speed, a motor speed, a wheel rotation speed, and the like.

Furthermore, for example, the data acquisition unit 102 includes various sensors for detecting information outside the host vehicle. Specifically, for example, the data acquisition unit 102 includes an imaging device such as a time of flight (ToF) camera, a stereo camera, a monocular camera, an infrared camera, another camera, and the like. Furthermore, for example, the data acquisition unit 102 includes an environment sensor for detecting weather, atmospheric phenomena, and the like, and a surrounding information detection sensor for detecting an object around the host vehicle. The environment sensor includes, for example, a raindrop sensor, a fog sensor, a sunshine sensor, a snow sensor, and the like. The surrounding information detection sensor includes, for example, an ultrasonic sensor, a radar, a light detection and ranging or laser imaging detection and ranging (LiDAR), a sonar, and the like.

Moreover, for example, the data acquisition unit 102 includes various sensors for detecting a current position of the host vehicle. Specifically, for example, the data acquisition unit 102 includes a global navigation satellite system (GNSS) receiver and the like that receives a GNSS signal from a GNSS satellite.

Furthermore, for example, the data acquisition unit 102 includes various sensors for detecting information inside the vehicle. Specifically, for example, the data acquisition unit 102 includes an imaging device that images a driver, a biological sensor that detects biological information of the driver, a microphone that collects voice in the vehicle interior, and the like. The biological sensor is provided on, for example, a seat surface, a steering wheel, and the like and detects biological information of a passenger sitting on the seat or a driver gripping the steering wheel.

The communication unit 103 performs communication with the in-vehicle device 104, various devices outside the vehicle, a server, a base station, and the like, transmits data supplied from each unit of the vehicle control system 100, and supplies received data to each unit of the vehicle control system 100. Note that a communication protocol supported by the communication unit 103 is not particularly limited, and furthermore, the communication unit 103 can support a plurality of types of communication protocols.

For example, the communication unit 103 performs wireless communication with the in-vehicle device 104 by a wireless LAN, Bluetooth (registered trademark), near field communication (NFC), a wireless USB (WUSB), and the like. Furthermore, for example, the communication unit 103 performs wired communication with the in-vehicle device 104 by a universal serial bus (USB), a high-definition multimedia interface (HDMI) (registered trademark), a mobile high-definition link (MHL), and the like via a connection terminal (not shown) (and a cable if necessary).

Moreover, for example, the communication unit 103 performs communication unit with a device (for example, an application server or a control server) existing on an external network (for example, the Internet, a cloud network, or an operator-specific network) via the base station or an access point. Furthermore, for example, the communication unit 103 performs communication with a terminal existing near the host vehicle (for example, a terminal of a pedestrian or a store, or a machine type communication (MTC) terminal) using peer to peer (P2P) technology. Moreover, for example, the communication unit 103 performs V2X communication such as vehicle to vehicle communication, vehicle to infrastructure communication, host vehicle to home communication, vehicle to pedestrian communication, and the like. Furthermore, for example, the communication unit 103 includes a beacon receiving unit that receives radio waves or electromagnetic waves transmitted from a wireless station and the like installed on a road and acquires information such as a current position, traffic congestion, traffic regulation, required time, and the like.

The in-vehicle device 104 includes, for example, a mobile device or a wearable device possessed by a passenger, an information device carried in or attached to the host vehicle, a navigation device that searches for a route to an arbitrary destination, and the like.

The output control unit 105 controls output of various information to a passenger of the host vehicle or the outside of the vehicle. For example, the output control unit 105 generates an output signal including at least one of visual information (for example, image data) or auditory information (for example, voice data) and supplies the output signal to the output unit 106, thereby controlling output of the visual information and the auditory information from the output unit 106. Specifically, for example, the output control unit 105 synthesizes image data imaged by different imaging devices of the data acquisition unit 102 to generate an overhead view image, a panoramic image, and the like, and supplies an output signal including the generated image to the output unit 106. Furthermore, for example, the output control unit 105 generates voice data including a warning sound, a warning message, and the like for danger such as collision, contact, or entry into a danger zone, and supplies an output signal including the generated voice data to the output unit 106.

The output unit 106 includes a device capable of outputting visual information or auditory information to a passenger of the host vehicle or the outside of the vehicle. For example, the output unit 106 includes a display device, an instrument panel, an audio speaker, a headphone, a wearable device such as a glasses-type display and the like worn by a passenger, a projector, a lamp, and the like. In addition to a device having a normal display, the display device included in the output unit 106 may be, for example, a device that displays visual information in a field of view of a driver, such as a head-up display, a transmissive display, a device having an augmented reality (AR) display function, and the like.

The drive system control unit 107 controls the drive system 108 by generating various control signals and supplying them to the drive system 108. Furthermore, the drive system control unit 107 supplies a control signal to each unit other than the drive system 108 as necessary, and performs notification of a control state of the drive system 108 and the like.

The drive system 108 includes various devices related to the drive system of the host vehicle. For example, the drive system 108 includes a driving force generation device for generating a driving force of an internal combustion engine, a driving motor, and the like, a driving force transmission mechanism for transmitting the driving force to wheels, a steering mechanism for adjusting a steering angle, a braking device for generating a braking force, an antilock brake system (ABS), an electronic stability control (ESC), an electric power steering device, and the like.

The body system control unit 109 controls the body system 110 by generating various control signals and supplying them to the body system 110. Furthermore, the body system control unit 109 supplies a control signal to each unit other than the body system 110 as necessary, and performs notification of a control state of the body system 110 and the like.

The body system 110 includes various devices of a body system mounted on a vehicle body. For example, the body system 110 includes a keyless entry system, a smart key system, a power window device, a power seat, a steering wheel, an air conditioner, various lamps (for example, a head lamp, a back lamp, a brake lamp, a blinker, a fog lamp, and the like), and the like.

The storage unit 111 includes, for example, a read only memory (ROM), a random access memory (RAM), a magnetic storage device such as a hard disc drive (HDD) and the like, a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-precision map such as a dynamic map and the like, a global map that is less precise than the high-precision map and covers a wider area, a local map including information around the host vehicle, and the like.

The automatic driving control unit 112 performs control related to automatic driving such as autonomous traveling, driving assistance, and the like. Specifically, for example, the automatic driving control unit 112 performs cooperative control for the purpose of realizing functions of an advanced driver assistance system (ADAS) including collision avoidance or shock mitigation of a host vehicle, following running based on a following distance, vehicle speed maintaining running, collision warning of the host vehicle, lane departure warning of the host vehicle, and the like. Furthermore, for example, the automatic driving control unit 112 performs cooperative control for the purpose of automatic driving and the like in which a vehicle autonomously travels without depending on an operation of the driver. The automatic driving control unit 112 includes a detection unit 131, a self-position estimation unit 132, a situation analysis unit 133, a planning unit 134, and an operation control unit 135.

The detection unit 131 detects various information necessary for controlling the automatic driving. The detection unit 131 includes a vehicle exterior information detection unit 141, a vehicle interior information detection unit 142, and a vehicle state detection unit 143.

The vehicle exterior information detection unit 141 performs detection processing of information outside the host vehicle on the basis of data or signals from each unit of the vehicle control system 100. For example, the vehicle exterior information detection unit 141 performs detection processing, recognition processing, and tracking processing of an object around the host vehicle, and detection processing of a distance to the object. The object to be detected includes, for example, a vehicle, a person, an obstacle, a structure, a road, a traffic light, a traffic sign, a road sign, and the like. Furthermore, for example, the vehicle exterior information detection unit 141 performs detection processing of a surrounding environment of the host vehicle. The surrounding environment to be detected includes, for example, weather, temperature, humidity, brightness, a state of a road surface, and the like. The vehicle exterior information detection unit 141 supplies data indicating a result of the detection processing to the self-position estimation unit 132, a map analysis unit 151, a traffic rule recognition unit 152, and a situation recognition unit 153 of the situation analysis unit 133, an emergency avoidance unit 171 of the operation control unit 135, and the like.

The vehicle interior information detection unit 142 performs detection processing of vehicle interior information on the basis of data or signals from each unit of the vehicle control system 100. For example, the vehicle interior information detection unit 142 performs authentication processing and recognition processing of a driver, detection processing of a state of the driver, detection processing of a passenger, detection processing of a vehicle interior environment, and the like. The state of the driver to be detected includes, for example, a physical condition, a wakefulness level, a concentration level, a fatigue level, a line-of-sight direction, and the like. The vehicle interior environment to be detected includes, for example, temperature, humidity, brightness, odor, and the like. The vehicle interior information detection unit 142 supplies data indicating a result of the detection processing to the situation recognition unit 153 of the situation analysis unit 133, the emergency avoidance unit 171 of the operation control unit 135, and the like.

The vehicle state detection unit 143 performs detection processing of a state of the host vehicle on the basis of data or signals from each unit of the vehicle control system 100. The state of the host vehicle to be detected includes, for example, speed, acceleration, a steering angle, presence/absence and contents of abnormality, a state of a driving operation, a position and inclination of a power seat, a state of a door lock, states of other in-vehicle devices, and the like. The vehicle state detection unit 143 supplies data indicating a result of the detection processing to the situation recognition unit 153 of the situation analysis unit 133, the emergency avoidance unit 171 of the operation control unit 135, and the like.

The self-position estimation unit 132 performs estimation processing of a position, posture, and the like of the host vehicle on the basis of data or signals from each unit of the vehicle control system 100 such as the vehicle exterior information detection unit 141, the situation recognition unit 153 of the situation analysis unit 133, and the like. Furthermore, the self-position estimation unit 132 generates a local map used for estimating a self-position (hereinafter referred to as a self-position estimation map) as necessary. The self-position estimation map is, for example, a highly accurate map using a technique such as simultaneous localization and mapping (SLAM) and the like. The self-position estimation unit 132 supplies data indicating a result of the estimation processing to the map analysis unit 151, the traffic rule recognition unit 152, the situation recognition unit 153, and the like of the situation analysis unit 133. Furthermore, the self-position estimation unit 132 stores the self-position estimation map in the storage unit 111.

The situation analysis unit 133 performs analysis processing of the host vehicle and a surrounding situation. The situation analysis unit 133 includes the map analysis unit 151, the traffic rule recognition unit 152, the situation recognition unit 153, and a situation prediction unit 154.

The map analysis unit 151 performs analysis processing of various maps stored in the storage unit 111 while using data or signals from each unit of the vehicle control system 100 such as the self-position estimation unit 132, the vehicle exterior information detection unit 141, and the like as necessary, and constructs a map including information necessary for automatic driving processing. The map analysis unit 151 supplies the constructed map to the traffic rule recognition unit 152, the situation recognition unit 153, the situation prediction unit 154, a route planning unit 161, an action planning unit 162, and an operation planning unit 163 of the planning unit 134, and the like.

The traffic rule recognition unit 152 performs recognition processing of traffic rules around the host vehicle on the basis of data or signals from each unit of the vehicle control system 100 such as the self-position estimation unit 132, the vehicle exterior information detection unit 141, the map analysis unit 151, and the like. By this recognition processing, for example, a position and a state of a signal around the host vehicle, contents of traffic regulations around the host vehicle, a travelable lane, and the like are recognized. The traffic rule recognition unit 152 supplies data indicating a result of the recognition processing to the situation prediction unit 154 and the like.

The situation recognition unit 153 performs recognition processing of a situation related to the host vehicle on the basis of data or signals from each unit of the vehicle control system 100 such as the self-position estimation unit 132, the vehicle exterior information detection unit 141, the vehicle interior information detection unit 142, the vehicle state detection unit 143, the map analysis unit 151, and the like. For example, the situation recognition unit 153 performs recognition processing of a situation of the host vehicle, a situation around the host vehicle, a situation of a driver of the host vehicle, and the like. Furthermore, the situation recognition unit 153 generates a local map used to recognize the situation around the host vehicle (hereinafter referred to as a situation recognition map) as necessary. The situation recognition map is, for example, an occupancy grid map.

The situation of the host vehicle to be recognized includes, for example, a position, posture, and movement (for example, speed, acceleration, a moving direction, and the like) of the host vehicle, presence/absence and contents of abnormality, and the like. The situation around the host vehicle to be recognized includes, for example, a type and a position of a surrounding stationary object, a type, a position, and movement (for example, speed, acceleration, a moving direction, and the like) of a surrounding moving object, a configuration of a surrounding road and a state of a road surface, surrounding weather, temperature, humidity, brightness, and the like. The state of the driver to be recognized includes, for example, a physical condition, a wakefulness level, a concentration level, a fatigue level, movement of a line of sight, a driving operation, and the like.

The situation recognition unit 153 supplies data indicating a result of the recognition processing (including the situation recognition map as necessary) to the self-position estimation unit 132, the situation prediction unit 154, and the like. Furthermore, the situation recognition unit 153 stores the situation recognition map in the storage unit 111.

The situation prediction unit 154 performs prediction processing of a situation related to the host vehicle on the basis of data or signals from each unit of the vehicle control system 100 such as the map analysis unit 151, the traffic rule recognition unit 152, the situation recognition unit 153, and the like. For example, the situation prediction unit 154 performs prediction processing of a situation of the host vehicle, a situation around the host vehicle, a situation of the driver, and the like.

The situation of the host vehicle to be predicted includes, for example, behavior of the host vehicle, occurrence of abnormality, a travelable distance, and the like. The situation around the host vehicle to be predicted includes, for example, behavior of a moving object around the host vehicle, a change in a signal state, a change in an environment such as weather, and the like. The situation of the driver to be predicted includes, for example, behavior, a physical condition, and the like of the driver.

The situation prediction unit 154 supplies data indicating a result of the prediction processing together with the data from the traffic rule recognition unit 152 and the situation recognition unit 153 to the route planning unit 161, the action planning unit 162, and the operation planning unit 163 of the planning unit 134, and the like.

The route planning unit 161 plans a route to a destination on the basis of data or signals from each unit of the vehicle control system 100 such as the map analysis unit 151, the situation prediction unit 154, and the like. For example, the route planning unit 161 sets a route from a current position to a designated destination on the basis of the global map. Furthermore, for example, the route planning unit 161 appropriately changes the route on the basis of a situation such as traffic congestion, an accident, traffic regulation, construction, and the like, and a physical condition of the driver, and the like. The route planning unit 161 supplies data indicating the planned route to the action planning unit 162 and the like.

The action planning unit 162 plans an action of the host vehicle for safely traveling the route planned by the route planning unit 161 within a planned time on the basis of data or signals from each unit of the vehicle control system 100 such as the map analysis unit 151, the situation prediction unit 154, and the like. For example, the action planning unit 162 performs planning of start, stop, a traveling direction (for example, forward movement, backward movement, left turn, right turn, direction change, and the like), a traveling lane, traveling speed, overtaking, and the like. The action planning unit 162 supplies data indicating the planned action of the host vehicle to the operation planning unit 163 and the like.

The operation planning unit 163 plans operation of the host vehicle for realizing the action planned by the action planning unit 162 on the basis of data or signals from each unit of the vehicle control system 100 such as the map analysis unit 151, the situation prediction unit 154, and the like. For example, the operation planning unit 163 plans acceleration, deceleration, a travel trajectory, and the like. The operation planning unit 163 supplies data indicating the planned operation of the host vehicle to an acceleration/deceleration control unit 172, a direction control unit 173, and the like of the operation control unit 135.

The operation control unit 135 controls the operation of the host vehicle. The operation control unit 135 includes the emergency avoidance unit 171, the acceleration/deceleration control unit 172, and the direction control unit 173.

The emergency avoidance unit 171 performs detection processing of an emergency such as collision, contact, entry into a danger zone, abnormality of the driver, abnormality of the vehicle, and the like on the basis of the detection results of the vehicle exterior information detection unit 141, the vehicle interior information detection unit 142, and the vehicle state detection unit 143. In a case of detecting occurrence of an emergency, the emergency avoidance unit 171 plans operation of the host vehicle for avoiding the emergency such as a sudden stop, a sudden turn, and the like. The emergency avoidance unit 171 supplies data indicating the planned operation of the host vehicle to the acceleration/deceleration control unit 172, the direction control unit 173, and the like.

The acceleration/deceleration control unit 172 performs acceleration/deceleration control for realizing operation of the host vehicle planned by the operation planning unit 163 or the emergency avoidance unit 171. For example, the acceleration/deceleration control unit 172 calculates a control target value of the driving force generation device or the braking device for realizing planned acceleration, deceleration, or sudden stop, and supplies a control command indicating the calculated control target value to the drive system control unit 107.

The direction control unit 173 performs direction control for realizing operation of the host vehicle planned by the operation planning unit 163 or the emergency avoidance unit 171. For example, the direction control unit 173 calculates a control target value of the steering mechanism for realizing the traveling trajectory or the sudden turn planned by the operation planning unit 163 or the emergency avoidance unit 171, and supplies a control command indicating the calculated control target value to the drive system control unit 107.

<Configuration Example of Object Recognition Model 201>

Figure 2:
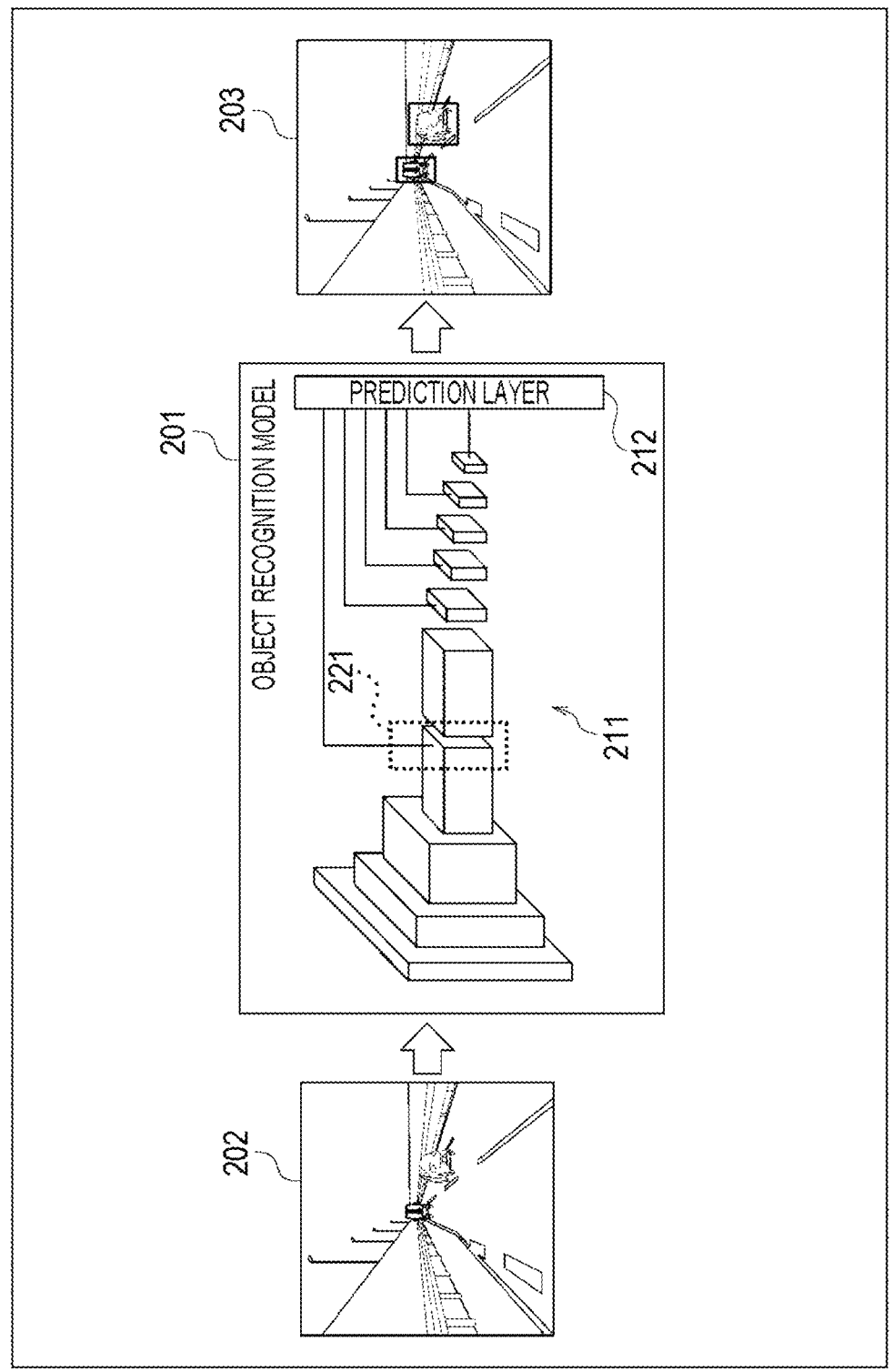
FIG. 2 is a diagram illustrating a first embodiment of an object recognition model.

FIG. 2 illustrates a configuration example of an object recognition model 201. The object recognition model 201 is used, for example, in the vehicle exterior information detection unit 141 of the vehicle control system 100 in FIG. 1.

For example, a captured image which is image data obtained by imaging the front of the vehicle 10 (for example, a captured image 202) is input to the object recognition model 201 as input data. Then, the object recognition model 201 performs recognition processing of a vehicle in front of the vehicle 10 on the basis of the captured image, and outputs an output image which is image data indicating a recognition result (for example, an output image 203) as output data.

The object recognition model 201 is a model using a convolutional neural network (CNN), and includes a feature extraction layer 211 and a prediction layer 212.

The feature extraction layer 211 includes a plurality of hierarchies, and each hierarchy includes a convolutional layer, a pooling layer, and the like. Each hierarchy of the feature extraction layer 211 generates one or more feature maps indicating features of the captured image by predetermined calculation, and supplies the feature maps to the next hierarchy. Furthermore, some hierarchies of the feature extraction layer 211 supply the feature maps to the prediction layer 212.

Note that size (the number of pixels) of the feature map generated in each hierarchy of the feature extraction layer 211 is different and gradually decreases as the hierarchy progresses.

Figure 3:
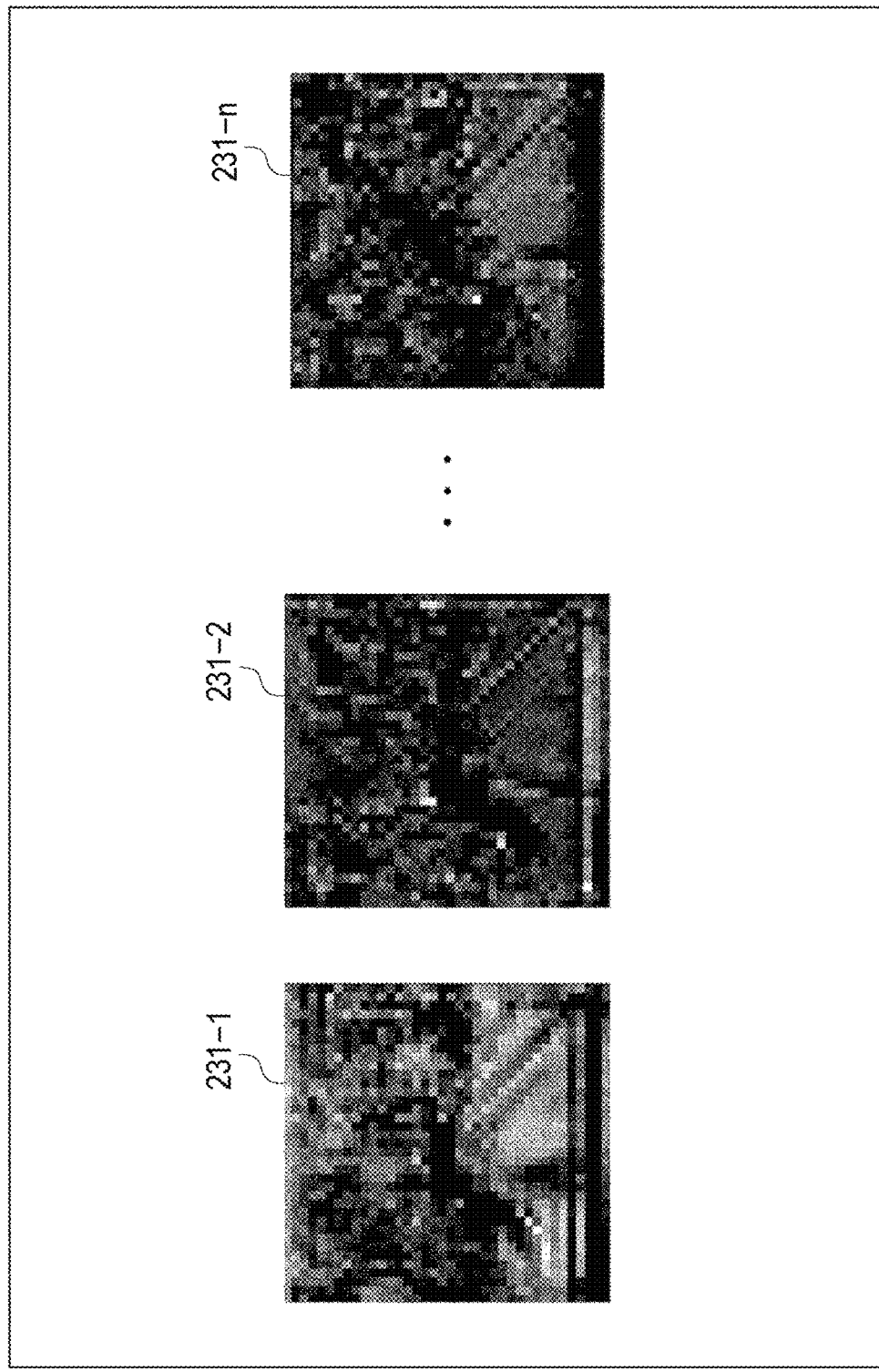
FIG. 3 is a diagram illustrating an example of feature maps.

FIG. 3 illustrates an example of feature maps 231-1 to 231-$n$ generated in and output from a hierarchy 221 that is an intermediate layer surrounded by a dotted square of the feature extraction layer 211 in FIG. 2.

In the hierarchy 221, n feature maps 231-1 to 231-$n$ are generated for one captured image. The feature maps 231-1 to 231-$n$ are, for example, image data in which 38 pixels in a vertical direction×38 pixels in a horizontal direction are two-dimensionally arranged. Furthermore, the feature maps 231-1 to 231-$n$ are feature maps having the largest size among the feature maps used for the recognition processing in the prediction layer 212.

Note that, hereinafter, it is assumed that serial numbers starting from 1 are assigned to the feature maps generated from each captured image for each hierarchy. For example, it is assumed that serial numbers 1 to n are respectively assigned to the feature maps 231-1 to **231-*n* generated from one captured image in the hierarchy 221**. Similarly, it is assumed that serial numbers 1 to N are assigned to feature maps generated from one captured image in another hierarchy. Note that N represents the number of feature maps generated from one captured image in the hierarchy.

The prediction layer 212 performs recognition processing of a vehicle in front of the vehicle 10 on the basis of the feature maps supplied from the feature extraction layer 211. The prediction layer 212 outputs an output image indicating a recognition result of the vehicle.

<Configuration Example of Information Processing Apparatus 301>

Figure 4:
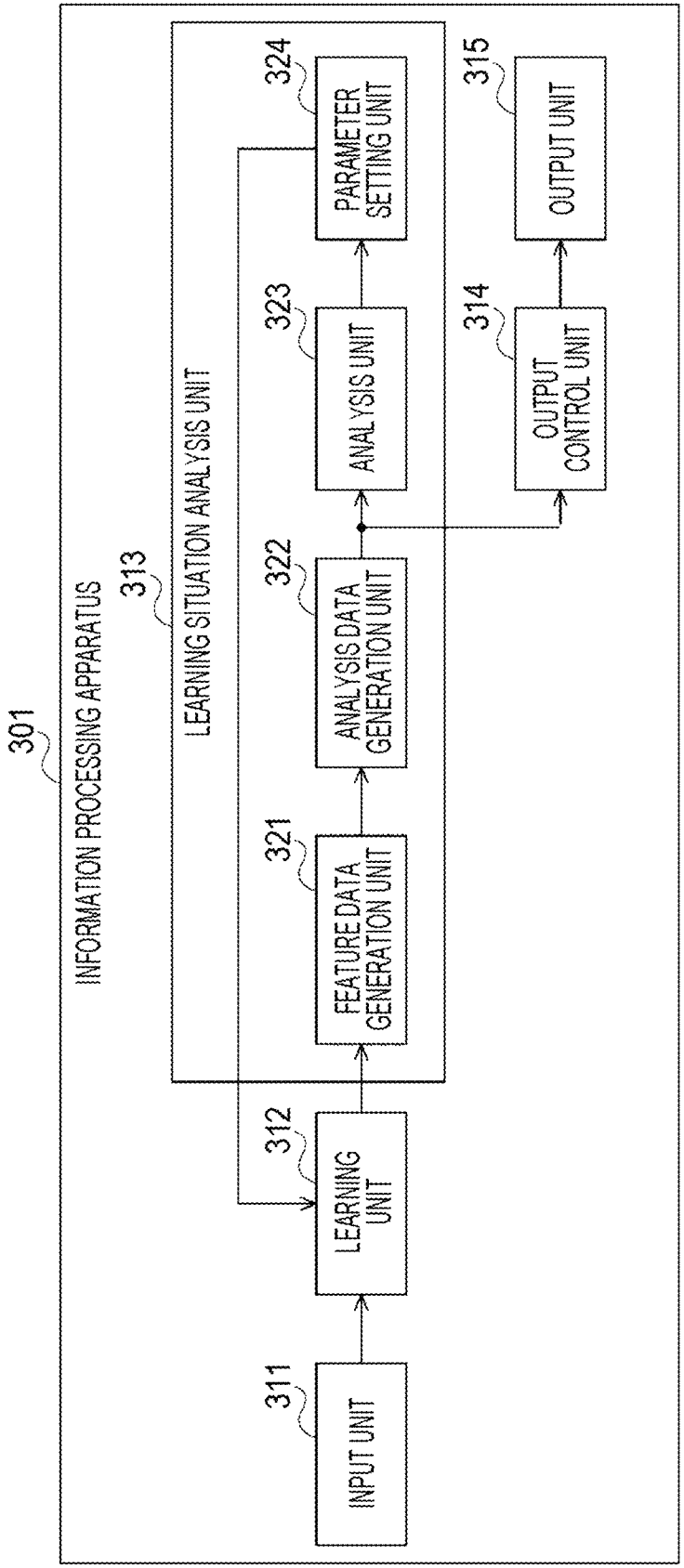
FIG. 4 is a block diagram illustrating a configuration example of an information processing apparatus to which the present technology is applied.

FIG. 4 illustrates a configuration example of an information processing apparatus 301 used for learning of a model using a neural network (hereinafter referred to as a learning model) such as the object recognition model 201 and the like in FIG. 2.

The information processing apparatus 301 includes an input unit 311, a learning unit 312, a learning situation analysis unit 313, an output control unit 314, and an output unit 315.

The input unit 311 includes an input device used for inputting various data, instructions, and the like, generates an input signal on the basis of the input data, instructions, and the like, and supplies the input signal to the learning unit 312. For example, the input unit 311 is used to input teacher data for learning of the learning model.

The learning unit 312 performs learning processing of the learning model. Note that a learning method of the learning unit 312 is not limited to a specific method. Furthermore, the learning unit 312 supplies a feature map generated in the learning model to the learning situation analysis unit 313.

The learning situation analysis unit 313 performs analysis and the like of a learning situation of the learning model by the learning unit 312 on the basis of the feature map supplied from the learning unit 312. The learning situation analysis unit 313 includes a feature data generation unit 321, an analysis data generation unit 322, an analysis unit 323, and a parameter setting unit 324.

The feature data generation unit 321 generates feature data that numerically represents a feature of the feature map, and supplies the feature data to the analysis data generation unit 322.

The analysis data generation unit 322 generates analysis data in which the feature data of the plurality of feature maps is arranged (arrayed), and supplies the analysis data to the analysis unit 323 and the output control unit 314.

The analysis unit 323 performs analysis processing of the learning situation of the learning model on the basis of the analysis data, and supplies data indicating an analysis result to the parameter setting unit 324.

The parameter setting unit 324 sets various parameters for learning of the learning model on the basis of the analysis result of the learning situation of the learning model. The parameter setting unit 324 supplies data indicating the set parameters to the learning unit 312.

The output control unit 314 controls output of various information by the output unit 315. For example, the output control unit 314 controls display of the analysis data by the output unit 315.

The output unit 315 includes an output device capable of outputting various information such as visual information, auditory information, and the like. For example, the output unit 315 includes a display, a speaker, and the like.

<Learning Situation Analysis Processing>

Figure 5:
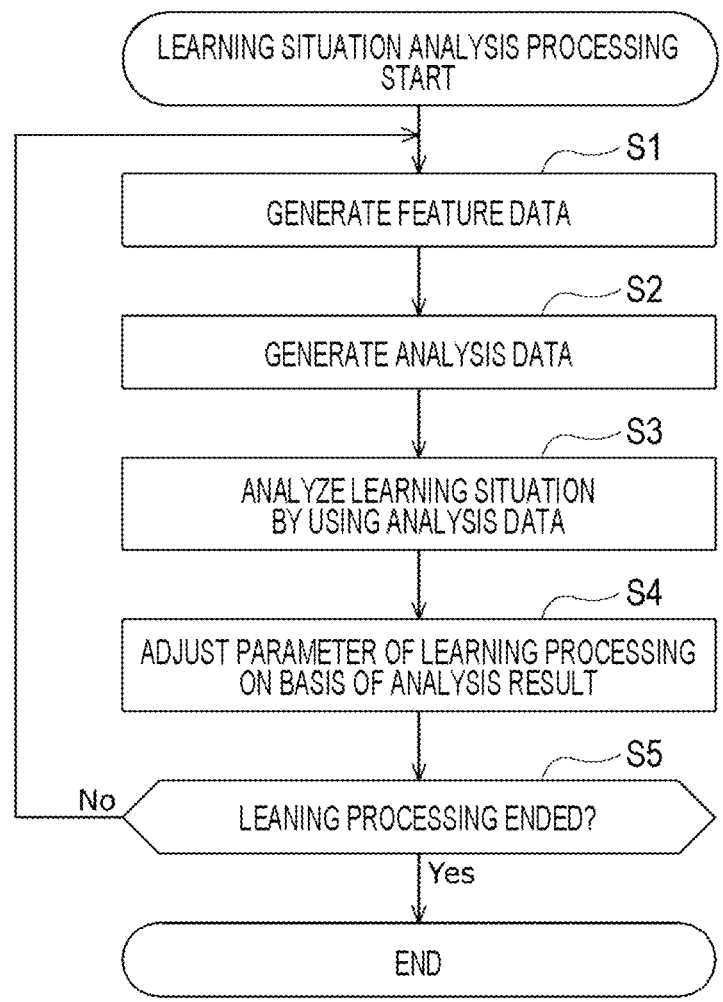
FIG. 5 is a flowchart for explaining learning situation analysis processing.

Next, learning situation analysis processing executed by the information processing apparatus 301 will be described with reference to a flowchart of FIG. 5.

This processing is started, for example, when the learning processing of the learning model is started by the learning unit 312.

Note that, hereinafter, a case where the learning processing of the object recognition model 201 in FIG. 2 is performed and its learning situation is analyzed will be described as an example. Furthermore, hereinafter, a case where 512 feature maps are generated from one captured image in the hierarchy 221 of the object recognition model 201 will be described as an example.

In step S1, the feature data generation unit 321 generates feature data. For example, the feature data generation unit 321 calculates variance indicating a degree of dispersion of pixel values of the feature maps by the following formula (1).

[Mathematical formula 1]

$$\text{var} = \frac{1}{I \times J} \sum_{i=0}^{I} \sum_{j=0}^{J} (A_{i,j} - \text{mean})^2 \quad (1)$$

$$\text{mean} = \frac{1}{I \times J} \sum_{i=0}^{I} \sum_{j=0}^{J} A_{i,j} \quad (2)$$

In the formula (1), var represents variance of pixel values of the feature maps. I represents a value obtained by subtracting 1 from the number of pixels in a column direction (vertical direction) of the feature map, and J represents a value obtained by subtracting 1 from the number of pixels in a row direction (horizontal direction) of the feature map. $A_{i,j}$ represents a pixel value of coordinates (i, j) of the feature map. mean represents an average of pixel values of the feature maps, and is calculated by a formula (2).

Figure 6:
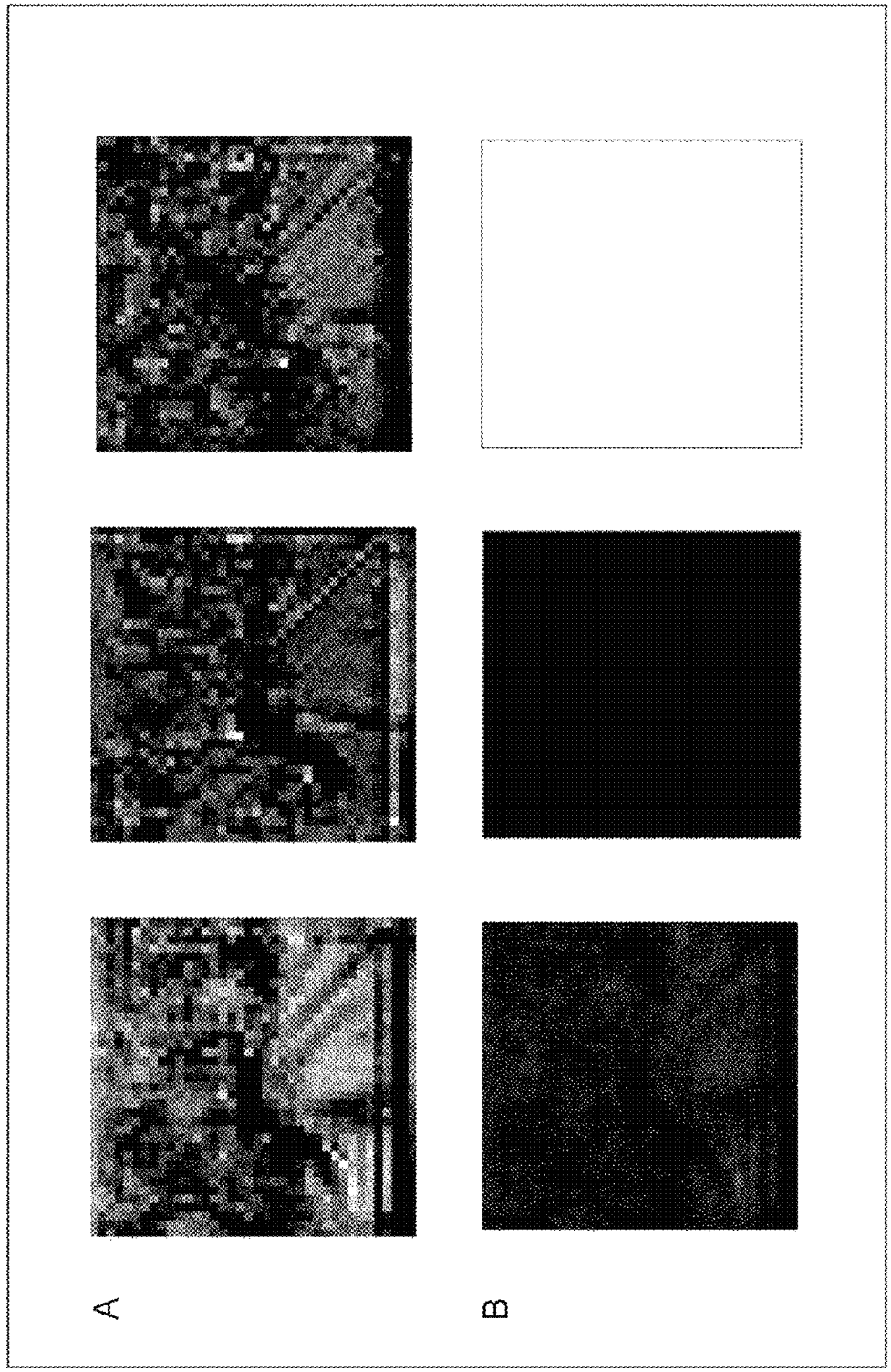
FIG. 6 is a diagram illustrating an example of feature maps having large variance of pixel values and feature maps having small variance of pixel values.

Note that A of FIG. 6 illustrates an example of feature maps having large variance of pixel values, and B of FIG. 6 illustrates an example of feature maps having small variance of pixel values. A feature map having larger variance of pixel values has a higher possibility of capturing a feature of a captured image, and a feature map having smaller variance of pixel values has a lower possibility of capturing a feature of a captured image.

For example, every time teacher data is input, the learning unit 312 performs learning processing of the object recognition model 201, and supplies a plurality of feature maps generated from a captured image included in the teacher data in the hierarchy 221 of the object recognition model 201 to the feature data generation unit 321. The feature data generation unit 321 calculates variance of pixel values of each feature map, and supplies feature data indicating the calculated variance to the analysis data generation unit 322.

In step S2, the analysis data generation unit 322 generates analysis data.

Figure 7:
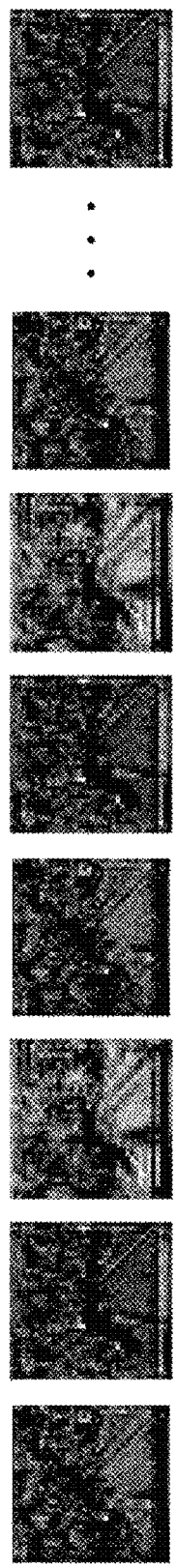
FIG. 7 is a diagram illustrating an example in which feature maps are arranged in a line.

FIG. 7 illustrates an example in which the feature maps generated in the hierarchy 221 of the object recognition model 201 are arranged in a line. The feature maps contain useful information, but are not very suitable for analyzing the learning situation of the object recognition model 201. For example, in a case where 200 captured images are used for the learning processing, a total of 102,400 (=512×200) feature maps are generated in the hierarchy 221. Therefore, it is difficult to analyze the learning situation of the object recognition model 201 using the feature maps as they are because an information amount is too large.

On the other hand, the analysis data generation unit 322 arranges the feature data of the plurality of feature maps generated from the plurality of captured images in the hierarchy 221 in predetermined order, thereby compressing an information amount and generating one piece of analysis data.

Figure 8:
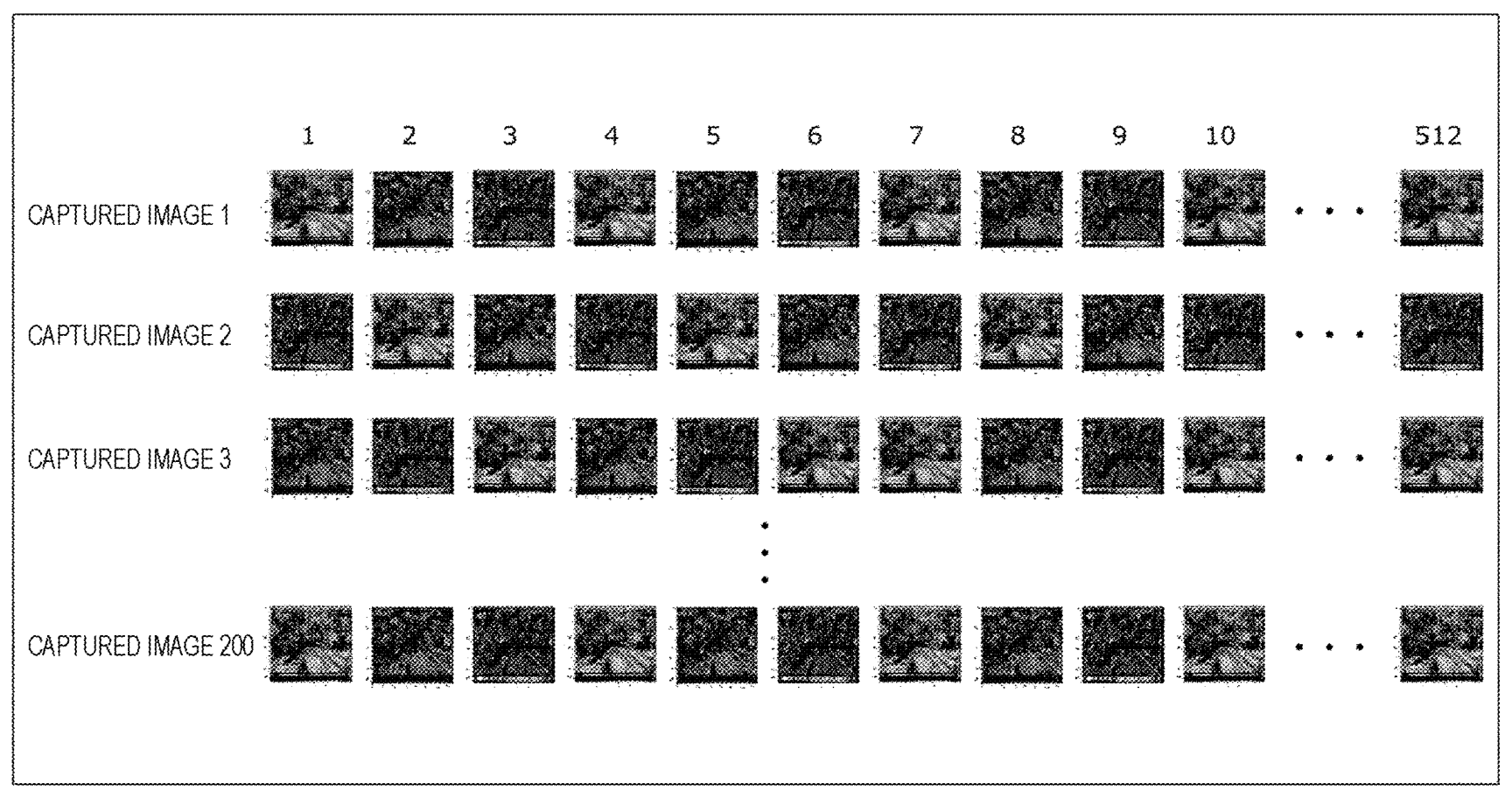

FIG. 8 illustrates an example in which feature maps generated from 200 captured images are two-dimensionally arranged in the hierarchy 221 of the object recognition model 201. In the drawing, a column in the vertical direction indicates a captured image number, and a row in the horizontal direction indicates a feature map number. In each row, 512 feature maps generated from each captured image are arranged in numerical order from left to right. For example, in the first row, 512 feature maps generated from the first captured image are arranged in numerical order from left to right.

Then, the analysis data generation unit 322 arranges 512 pieces of feature data (variance of each feature map) based on 512 feature maps generated from each captured image in numerical order of corresponding feature maps for each captured image, thereby generating a 512-dimensional vector (hereinafter referred to as a variance vector). For example, for a captured image 1 in FIG. 8, one variance vector having 512 pieces of feature data based on feature maps 1 to 512 generated from the captured image 1 as elements is generated. Then, variance vectors 1 to 200 for the captured images 1 to 200 are generated.

Figure 9:
FIG. 9 is a diagram illustrating an example of a variance vector and an image of the variance vector.

FIG. 9 illustrates an example of a variance vector and an imaged variance vector. The image of the variance vector is obtained by arranging pixels indicating colors according to values of elements (feature data) of the variance vector in order in the horizontal direction. For example, the color of the pixel is set to be redder as the value of the feature data (variance of the feature map), which is the pixel value, decreases, and to be bluer as the value of the feature data (variance of the feature map), which is the pixel value, increases. Note that the image of the variance vector is actually a color image, but is illustrated by a grayscale image here.

Then, the analysis data generation unit 322 generates analysis data including image data in which elements (feature data) of the variance vector of each captured image are pixels.

Figure 10:
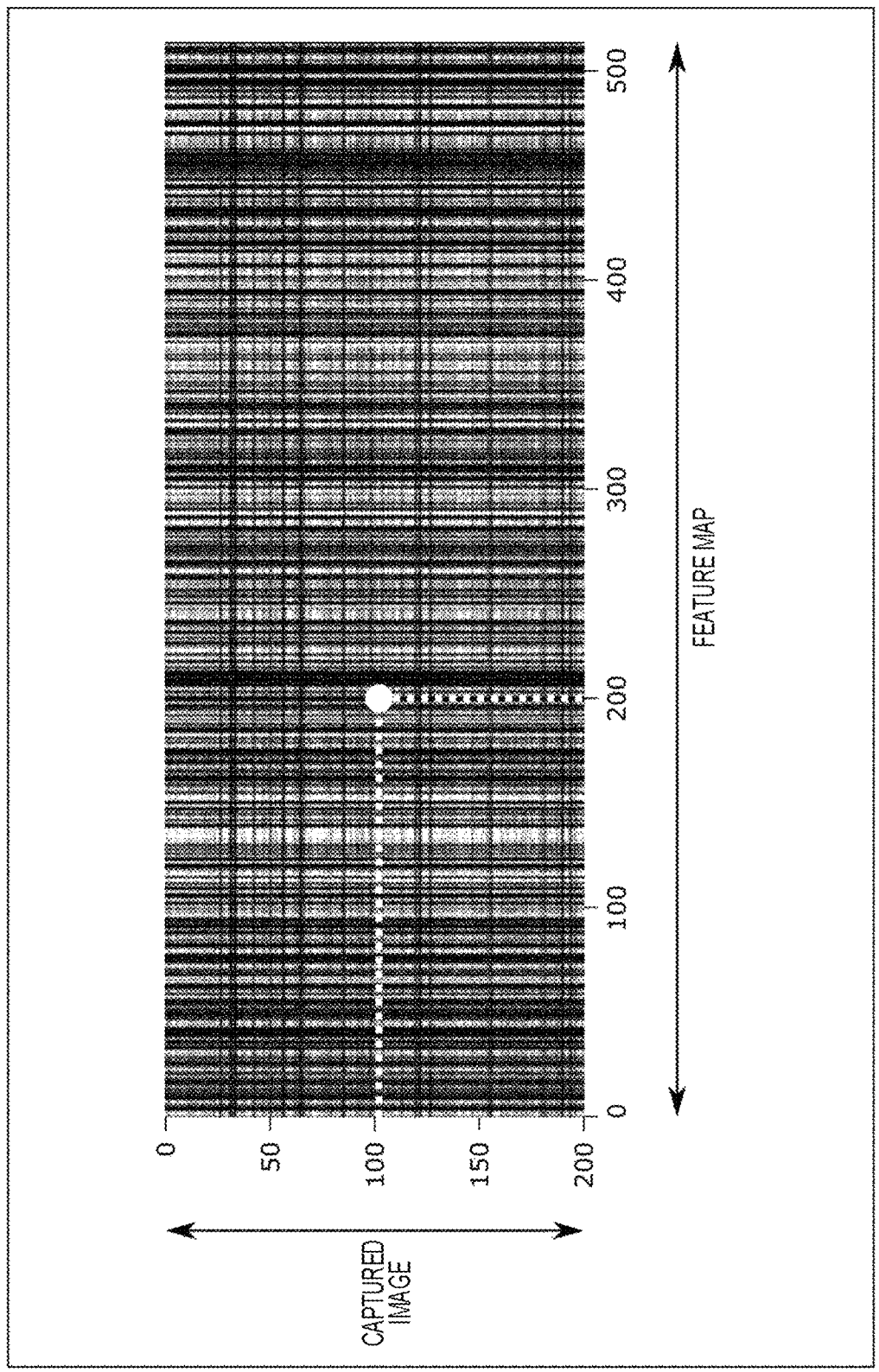
FIG. 10 is a diagram illustrating an example of analysis data.

FIG. 10 illustrates an example in which analysis data generated on the basis of the feature maps of FIG. 8 is imaged. Note that, for example, similarly to the image of the variance vector in FIG. 9, a color of a pixel of the analysis data is set to be redder as a value of feature data, which is a pixel value, decreases, and to be bluer as the value of the feature data, which is the pixel value, increases. Note that the image of the analysis data is actually a color image, but is illustrated by a grayscale image here. Furthermore, an x-axis direction (horizontal direction) of the analysis data indicates a feature map number, and a y-axis direction (vertical direction) thereof indicates a captured image number.

In the analysis data of FIG. 10, feature data of each feature map is arranged in the same arrangement order as the feature maps of FIG. 8. In other words, in the x-axis direction (horizontal direction) of the analysis data, 512 pieces of feature data based on 512 feature maps generated from the same captured images are arranged in numerical order of the feature maps. Furthermore, in the y-axis direction of the analysis data, the feature data based on the feature maps corresponding to each other (of the same number) of the different captured images is arranged in numerical order of the captured images. A white circle in the drawing indicates a position of a pixel corresponding to the 200th feature map 200 of the 100th captured image 100.

The analysis data generation unit 322 supplies the generated analysis data to the analysis unit 323 and the output control unit 314.

The output unit 315 displays the analysis data, for example, under the control of the output control unit 314.

In step S3, the analysis unit 323 analyzes a learning situation by using the analysis data.

Figure 11:
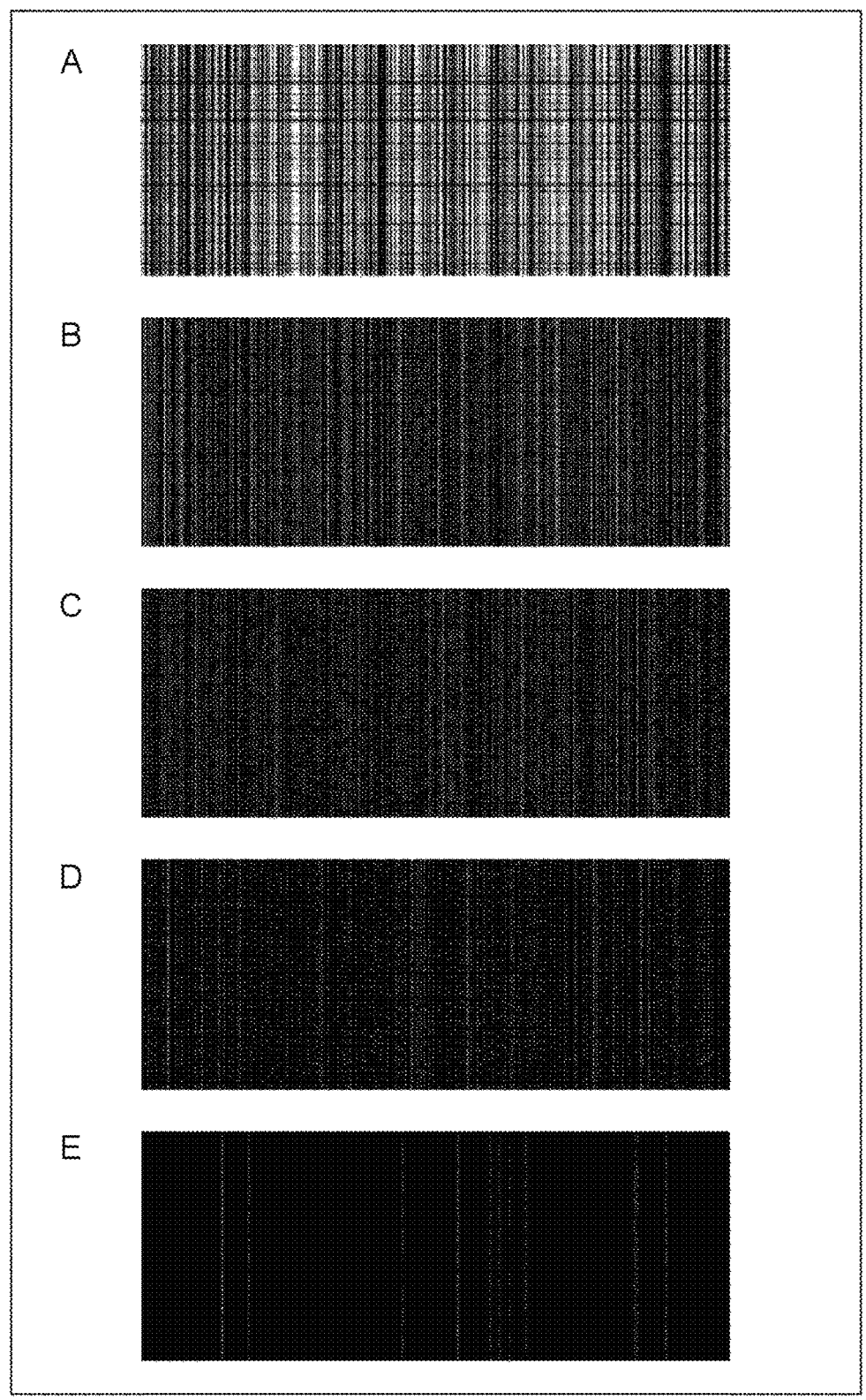
FIG. 11 is a diagram illustrating a first example of a state of change in the analysis data with progress of learning.

FIG. 11 illustrates an example of a state of change in the analysis data with progress of learning. Analysis data in A to E of FIG. 11 is arranged in learning progress order. The analysis data in A of FIG. 11 is the oldest, and the analysis data in E of FIG. 11 is the latest.

In the analysis data in A of FIG. 11 at the beginning of learning, there are many horizontal lines (lines in the x-axis direction) and vertical lines (lines in the y-axis direction). On the other hand, as the learning progresses, the number of horizontal lines and vertical lines decreases. In the analysis data of E of FIG. 11, the horizontal line does not exist, and the number of vertical lines is also about ten.

Here, the horizontal line is, for example, a row in the x-axis direction, in which pixels having pixel values (values of feature data) equal to or greater than a predetermined threshold value exist equal to or greater than a predetermined threshold value. The vertical line is, for example, a column in the y-axis direction, in which pixels having pixel values (values of feature data) equal to or greater than a predetermined threshold value exist equal to or greater than a predetermined threshold value. Furthermore, the number of horizontal lines and vertical lines is counted for each row in the x-axis direction and each column in the y-axis direction of the analysis data. In other words, even if a plurality of horizontal lines or a plurality of vertical lines is adjacent to each other and looks like one line, the lines are counted as different lines.

Then, as illustrated in this example, a state in which there is no horizontal line of the analysis data and the vertical lines thereof converge within a predetermined range is an ideal state, and is a state in which learning of the learning model is appropriately performed.

Specifically, in a case where there is a feature map in which variance of pixel values increases regardless of contents of a captured image (hereinafter referred to as a high variance feature map), a vertical line appears in a column corresponding to the high variance feature map of the analysis data. The high variance feature map is a feature map that extracts a feature of a captured image regardless of contents of the captured image and is highly likely to contribute to recognition of an object of the learning model.

On the other hand, in a case where there is a feature map in which variance of pixel values decreases regardless of contents of a captured image (hereinafter referred to as a low variance feature map), no vertical line appears in a column corresponding to the low variance feature map of the analysis data. The low variance feature map is a feature map that does not extract a feature of a captured image regardless of contents of the captured image and is less likely to contribute to recognition of an object of the learning model.

Therefore, as the number of high variance feature maps increases, the number of vertical lines of the analysis data increases, and as the number of high variance feature maps decreases, the number of vertical lines of the analysis data decreases.

Note that the high variance feature map does not necessarily contribute to recognition of an object to be recognized by the learning model (for example, a vehicle), and in a case where learning is not sufficient, there is also a case where it contributes to recognition of an object other than the object to be recognized. However, if the learning model has been appropriately learned, the high variance feature map is a feature map that contributes to recognition of an object to be recognized by the learning model.

Here, in general, in learning processing of a learning model using a neural network, regularization processing is performed in order to suppress over-learning, reduce weight of the neural network, and the like. By this regularization processing, a type of a feature amount extracted from a captured image is narrowed down to some extent. In other words, the number of feature maps from which features of the captured image can be extracted, that is, the number of high variance feature maps is narrowed down to some extent.

Figure 12:
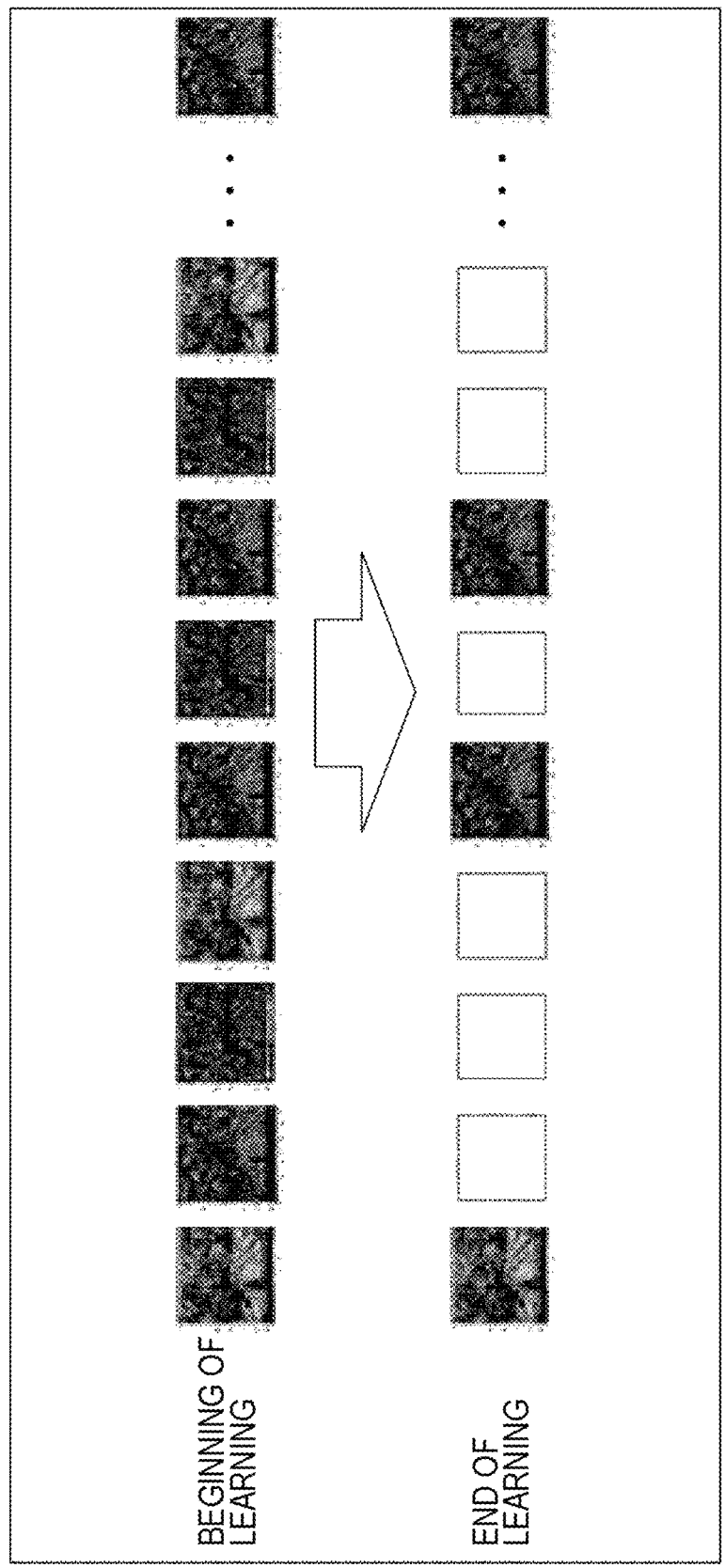
FIG. 12 is a diagram illustrating an example of feature maps at the beginning of learning and at the end of learning.

For example, as illustrated in FIG. 12, there are many high variance feature maps at the beginning of learning, but the number of high variance feature maps is narrowed down at the end of the learning.

Figure 13:
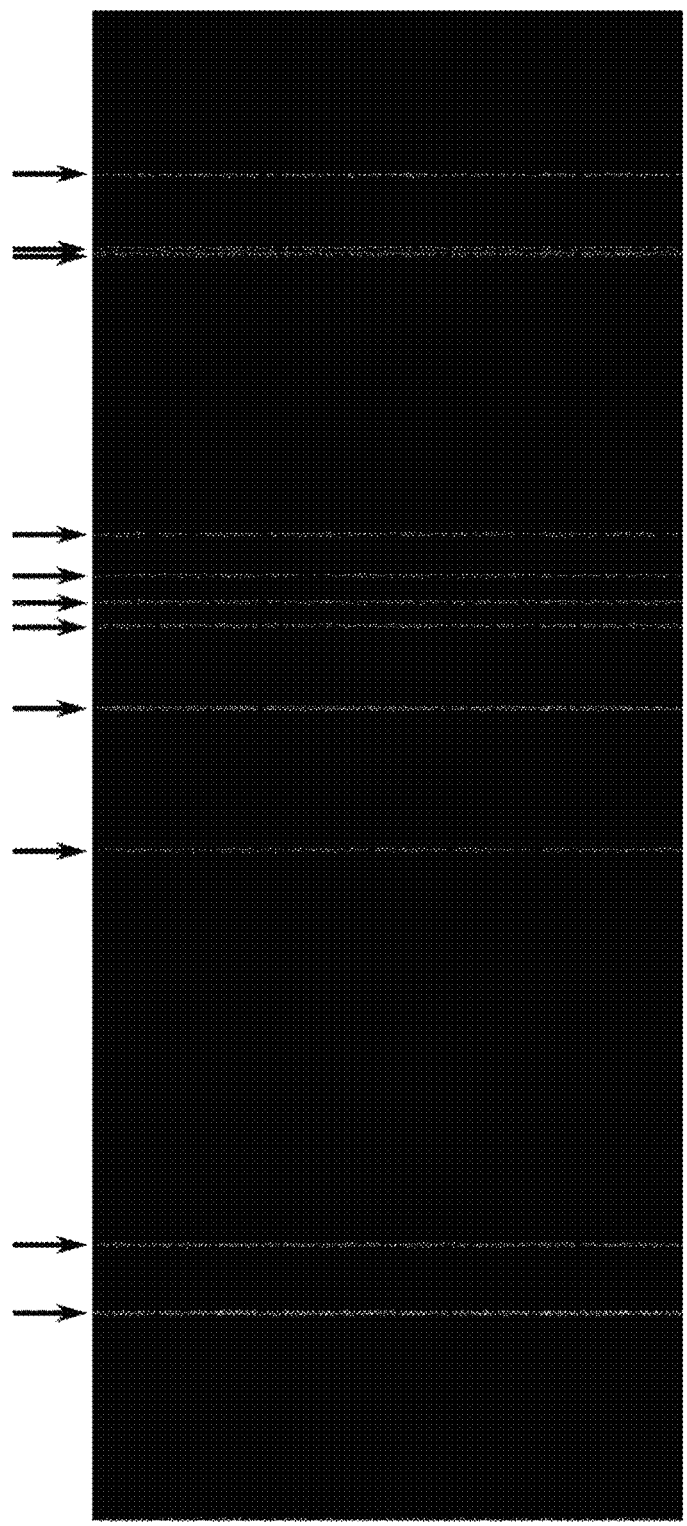
FIG. 13 is a diagram illustrating an example of the analysis data.

Therefore, for example, as indicated by arrows in FIG. 13, a state in which the number of vertical lines of the analysis data converges within a predetermined range is an ideal state in which regularization is normally performed.

Figure 14:
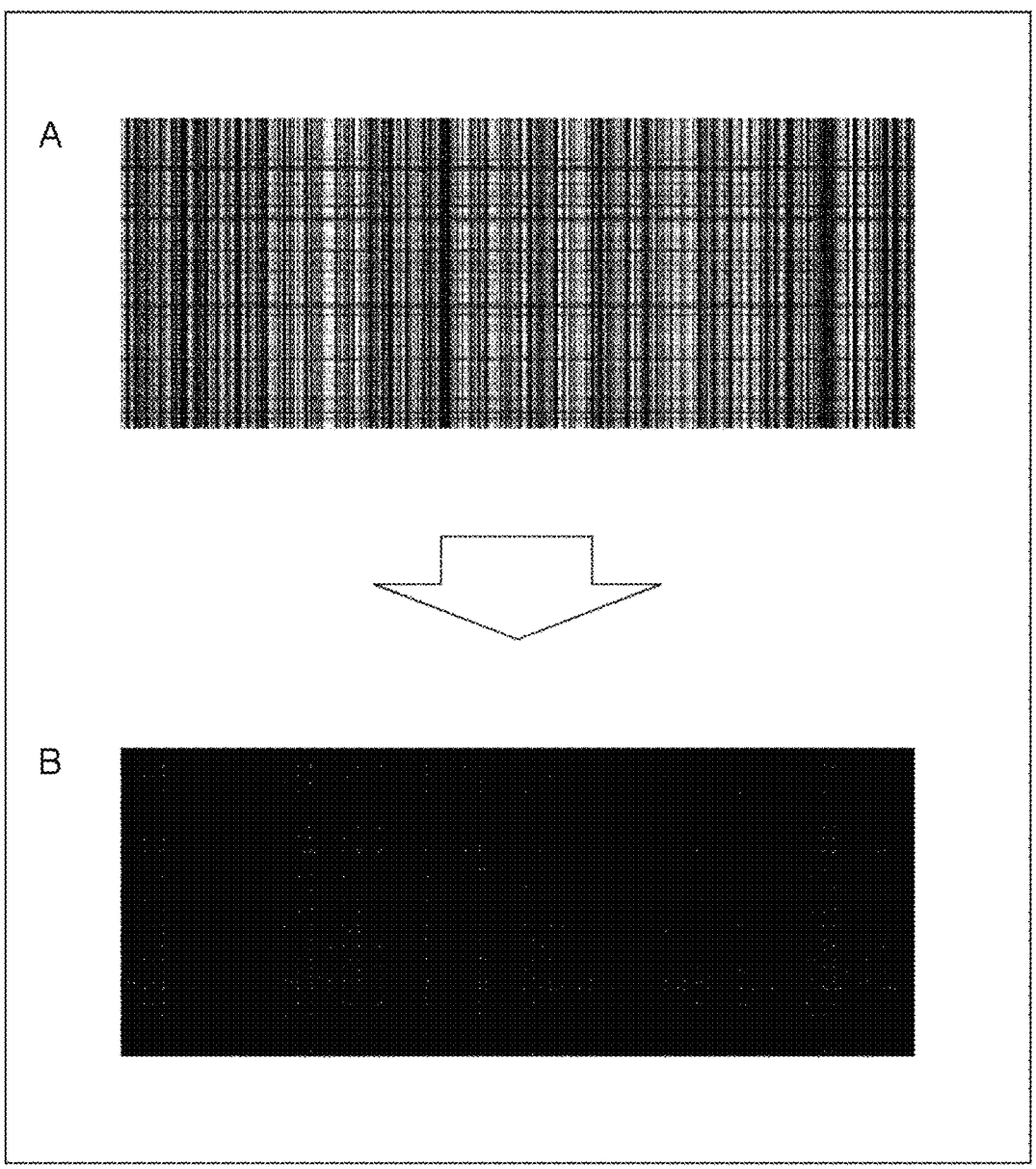
FIG. 14 is a diagram illustrating an example of the analysis data in a case where regularization is too strong.
Figure 15:
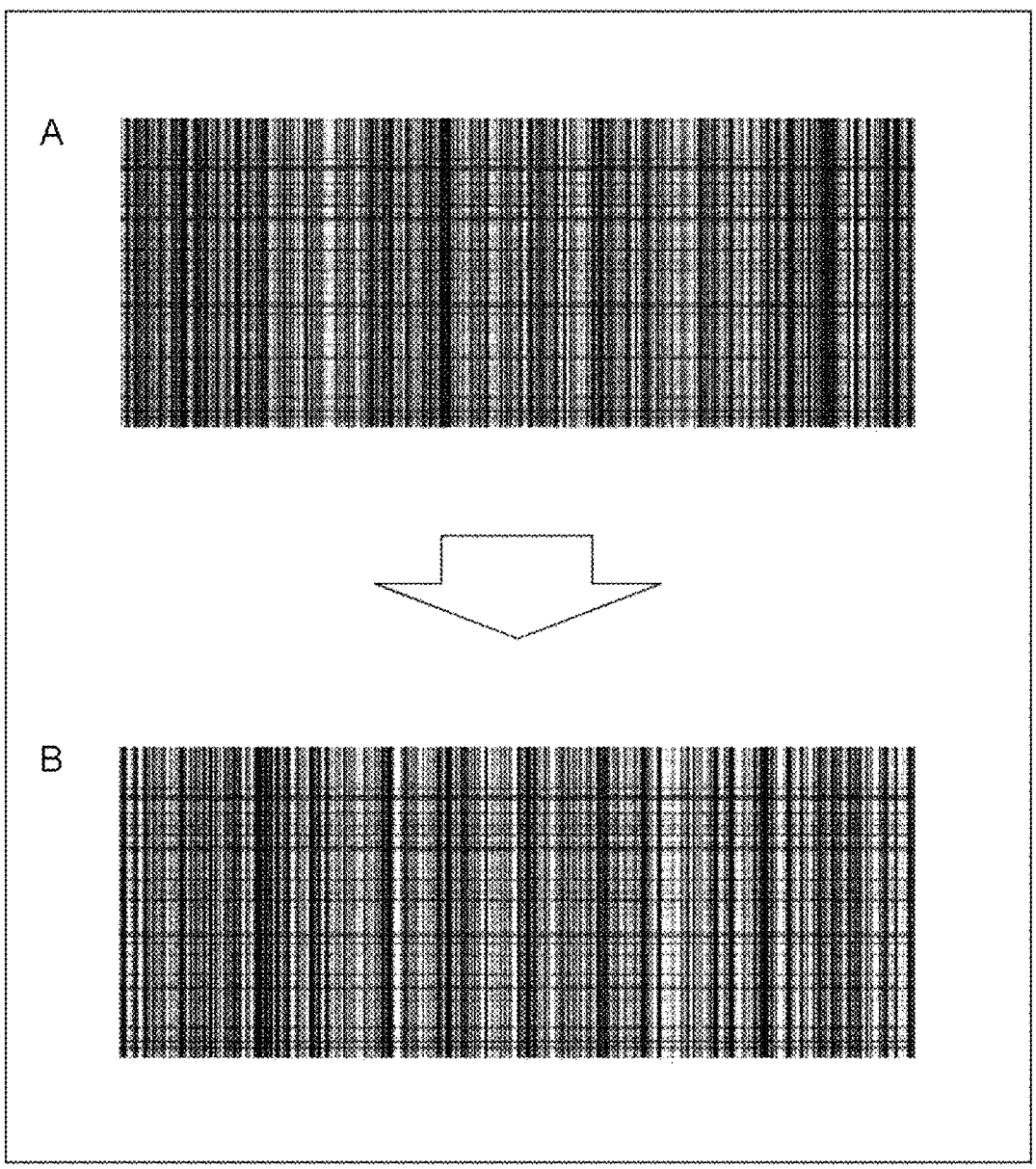
FIG. 15 is a diagram illustrating an example of the analysis data in a case where the regularization is too weak.

On the other hand, as illustrated in FIG. 14, a state in which the number of vertical lines of the analysis data decreases too much or becomes zero as the learning progresses is a state in which the regularization is too strong and the feature of the captured image cannot be sufficiently extracted. Furthermore, as illustrated in FIG. 15, a state in which the number of vertical lines of the analysis data does not decrease even when the learning progresses is a state in which the regularization is too weak and types of the features to be extracted from the captured image are not completely narrowed down.

Therefore, in a case where the number of vertical lines of the analysis data converges within a predetermined range, the analysis unit 323 determines that regularization of the learning processing is normally performed. On the other hand, in a case where the number of vertical lines of the analysis data converges to a value exceeding the predetermined range or in a case where the number of vertical lines does not converge, the analysis unit 323 determines that the regularization is too weak. Furthermore, in a case where the number of vertical lines of the analysis data converges to a value less than the predetermined range, the analysis unit 323 determines that the regularization is too strong.

Note that even in a case where the regularization processing is not performed, the number of vertical lines of the analysis data decreases and converges as the learning progresses. In this case, the number of vertical lines of the analysis data converges to a large value as compared with a case where the regularization processing is not performed. However, similarly to a case where the regularization processing is performed, it is possible to determine whether or not the learning processing is normally performed on the basis of the number of vertical lines.

Furthermore, in a case where there is a captured image in which variance of pixel values of most of the feature maps increases (hereinafter referred to as a high variance captured image), a horizontal line appears in a row corresponding to the high variance captured image of the analysis data. On the other hand, in a case where there is a captured image in which variance of pixel values of most of the feature maps decreases (hereinafter referred to as a low variance captured image), a horizontal line does not appear in a row corresponding to the low variance captured image of the analysis data.

Therefore, in a case where the high variance captured image and the low variance captured image are mixed, a horizontal line appears in the analysis data. This indicates a state in which role sharing of each feature map is not sufficiently performed, that is, features extracted by each feature map are not clearly separated, and the features extracted by each feature map vary depending on contents of the captured images.

Therefore, the smaller the number of horizontal lines of the analysis data, the better, and a state in which the number of horizontal lines is zero is the most ideal state.

Therefore, in a case where the number of horizontal lines of the analysis data converges to a value less than a predetermined threshold value, the analysis unit 323 determines that the learning processing is normally performed. On the other hand, in a case where the number of horizontal lines of the analysis data converges to a value equal to or more than the predetermined threshold value, or in a case where the number of horizontal lines does not converge, the analysis unit 323 determines that the learning process is not normally performed.

Then, the analysis unit 323 supplies data indicating an analysis result of the learning situation to the parameter setting unit 324.

In step S4, the parameter setting unit 324 adjusts a parameter of the learning processing on the basis of the analysis result. For example, in a case where the analysis unit 323 determines that the regularization is too strong, the parameter setting unit 324 makes a value of a regularization parameter used for the regularization processing smaller than a current value. On the other hand, in a case where the analysis unit 323 determines that the regularization is too weak, the parameter setting unit 324 makes the value of the regularization parameter larger than the current value. Note that the larger the value of the regularization parameter, the stronger the regularization, and the smaller the value of the regularization parameter, the weaker the regularization. The parameter setting unit 324 supplies data indicating the regularization parameter after adjustment to the learning unit 312.

The learning unit 312 sets the value of the regularization parameter to the value set by the parameter setting unit 324. Therefore, the regularization is more normally performed in the learning processing of the learning model.

Note that, for example, a user may adjust a learning parameter such as the regularization parameter and the like with reference to the analysis data displayed on the output unit 315.

In step S5, the learning situation analysis unit 313 determines whether or not the learning processing by the learning unit 312 has ended. In a case where it is determined that the learning processing has not been ended yet, the processing returns to step S1. Thereafter, the processing of steps S1 to S5 is repeatedly executed until it is determined in step S5 that the learning processing has ended.

On the other hand, in a case where it is determined in step S5 that the learning processing has ended, the learning situation analysis processing ends.

As described above, the learning situation of the learning model by the learning unit 312 can be analyzed. Furthermore, it is possible to appropriately set the parameter of the learning processing on the basis of the analysis result to improve learning accuracy or shorten a learning time.

Furthermore, the user can easily recognize the learning situation of the learning model by visually recognizing the analysis data.

2. Case Example of Analysis of Learning Situation

Next, a case example in which a learning situation of a learning model is analyzed using the information processing apparatus 301 of FIG. 4 will be described with reference to FIGS. 16 to 22.

Note that, in the above description, an example of analyzing the learning situation of the object recognition model 201 that performs the recognition processing of the vehicle on the basis of the captured image has been described. However, the type of image data used by the learning model to be analyzed by the information processing apparatus 301 and the type of the object to be recognized are not particularly limited. Hereinafter, a case example will be described in which a learning situation of an object recognition model that performs recognition processing of a vehicle in front of the vehicle 10 is analyzed on the basis of a captured image obtained by imaging the front of the vehicle 10 and a millimeter wave image output from a millimeter wave radar that monitors the front of the vehicle 10.

<Configuration Example of Object Recognition Model 401>

Figure 16:
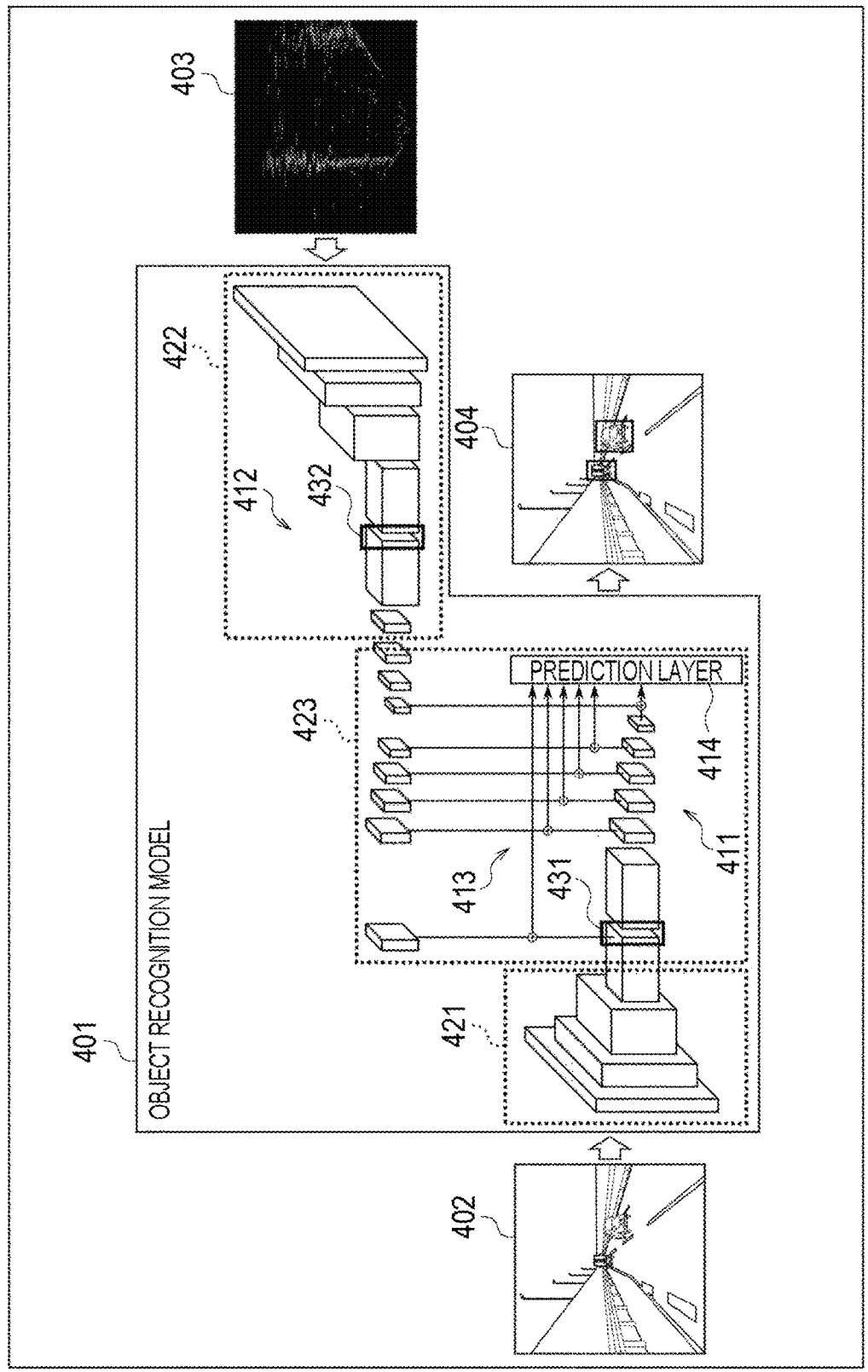
FIG. 16 is a diagram illustrating a second embodiment of an object recognition model.

FIG. 16 illustrates a configuration example of an object recognition model 401 that is a learning model to be analyzed for a learning situation. The object recognition model 401 is used, for example, in the vehicle exterior information detection unit 141 of the vehicle control system 100 in FIG. 1.

For example, a captured image that is image data obtained by imaging the front of the vehicle 10 (for example, a captured image 402) and a millimeter wave image output from the millimeter wave radar that monitors the front of the vehicle 10 (for example, a millimeter wave image 403) are input to the object recognition model 401 as input data. Note that the millimeter wave image is, for example, image data representing a distribution of intensity of a received signal of the millimeter wave radar reflected by the object in front of the vehicle 10 in a bird's-eye view. Then, the object recognition model 401 performs recognition processing of a vehicle in front of the vehicle 10 on the basis of the captured image and the millimeter wave image, and outputs an output image which is image data indicating a recognition result (for example, an output image 404) as output data.

The object recognition model 401 is a learning model using a Deconvolutional Single Shot Detector (DSSD). The object recognition model 401 includes a feature extraction layer 411, a feature extraction layer 412, a combining unit 413, and a prediction layer 414.

The feature extraction layer 411 has a configuration similar to that of the feature extraction layer 211 of the object recognition model 201 in FIG. 2. Each hierarchy of the feature extraction layer 411 generates a feature map indicating a feature of the captured image by predetermined calculation, and supplies the feature map to the next hierarchy. Furthermore, some hierarchies of the feature extraction layer 411 supply the feature maps to the combining unit 413.

The feature extraction layer 412 has a hierarchical structure, and each hierarchy includes a convolutional layer, a pooling layer, and the like. Each hierarchy of the feature extraction layer 412 generates a feature map indicating a feature of the millimeter wave image by predetermined calculation, and supplies the feature map to the next hierarchy. Furthermore, some hierarchies of the feature extraction layer 412 supply the feature maps to the combining unit 413. Moreover, the feature extraction layer 412 converts the millimeter wave image into an image in the same camera coordinate system as the captured image.

The combining unit 413 combines the feature maps output from the corresponding hierarchies of the feature extraction layer 411 and the feature extraction layer 412, and supplies the combined feature maps to the prediction layer 414.

The prediction layer 414 performs recognition processing of a vehicle in front of the vehicle 10 on the basis of the feature maps supplied from the combining unit 413. The prediction layer 414 outputs an output image indicating a recognition result of the vehicle.

Note that the object recognition model 401 is divided into a camera network 421, a millimeter wave radar network 422, and a combining network 423.

The camera network 421 includes a first half portion of the feature extraction layer 411 that generates a feature map that is not to be combined from the captured image.

The millimeter wave radar network 422 includes a first half portion of the feature extraction layer 412 that generates a feature map that is not to be combined from the millimeter wave image.

The combining network 423 includes a second half portion of the feature extraction layer 411 that generates a feature map to be combined, a second half portion of the feature extraction layer 412 that generates a feature map to be combined, the combining unit 413, and the prediction layer 414.

Here, learning processing of the object recognition model 401 has been performed, and recognition processing of a vehicle in front of the vehicle 10 has been performed using the object recognition model 401 after learning. As a result, recognition of the vehicle has failed without being able to recognize anything.

Therefore, a learning situation of the object recognition model 401 has been analyzed by the learning situation analysis processing described above with reference to FIG. 5. Specifically, analysis processing of a feature map generated in and output from a hierarchy 431, which is an intermediate layer of the feature extraction layer 411 surrounded by a thick frame line in FIG. 16, and a feature map generated in and output from a hierarchy 432, which is an intermediate layer of the feature extraction layer 412, has been performed. Note that the feature map generated in the hierarchy 431 is a feature map having the largest size among the feature maps of the feature extraction layer 411 used for the recognition processing of the prediction layer 414. The feature map generated in the hierarchy 432 is a feature map having the largest size among the feature maps of the feature extraction layer 412 used for the recognition processing of the prediction layer 414.

Then, in analysis data based on the feature map generated in the hierarchy 431 of the feature extraction layer 411, as the learning processing proceeds, a horizontal line disappears, and the number of vertical lines converges within a predetermined range, as illustrated in FIG. 11 described above.

Figure 17:
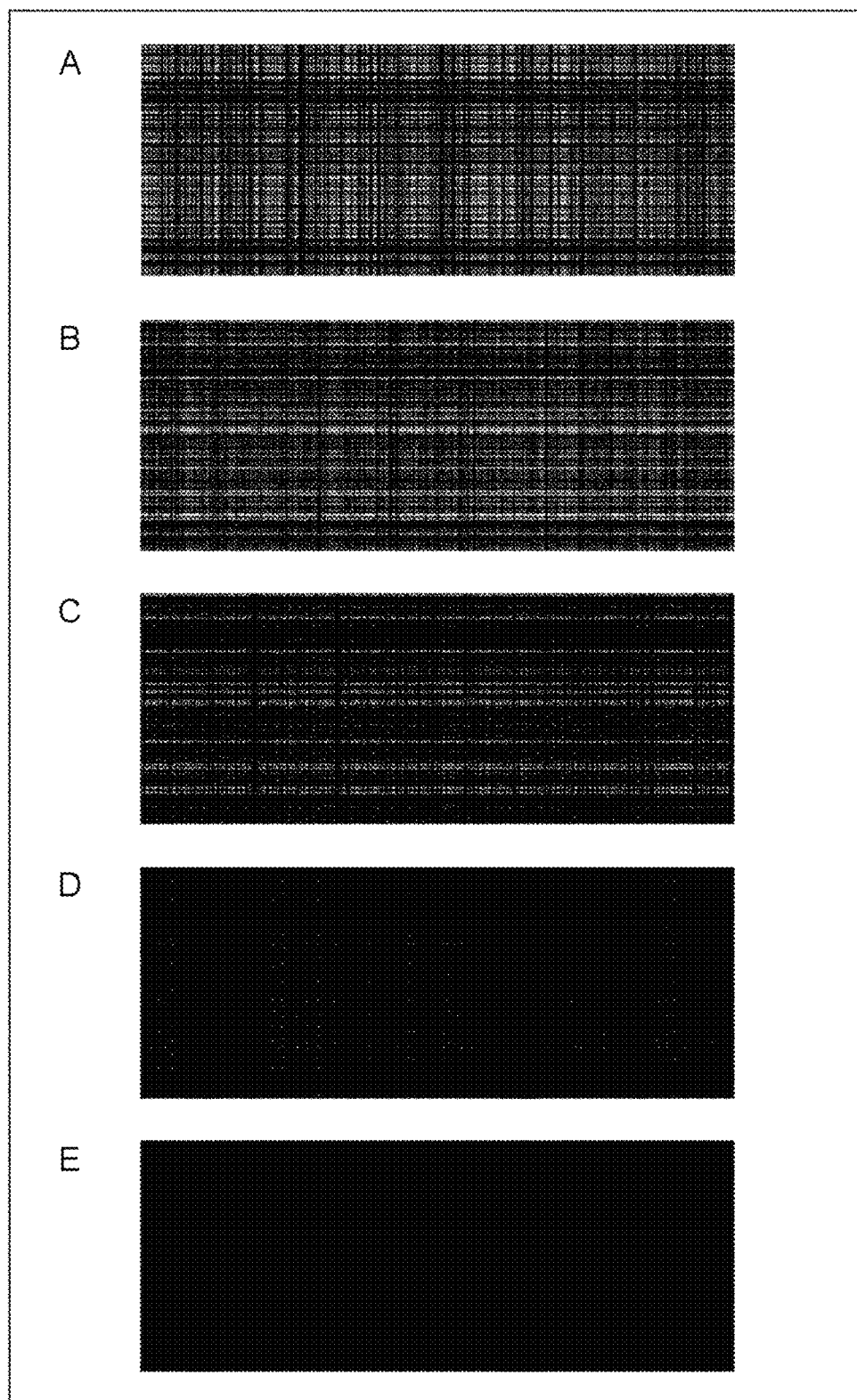
FIG. 17 is a diagram illustrating a second example of a state of change in analysis data with progress of learning.
Figure 18:
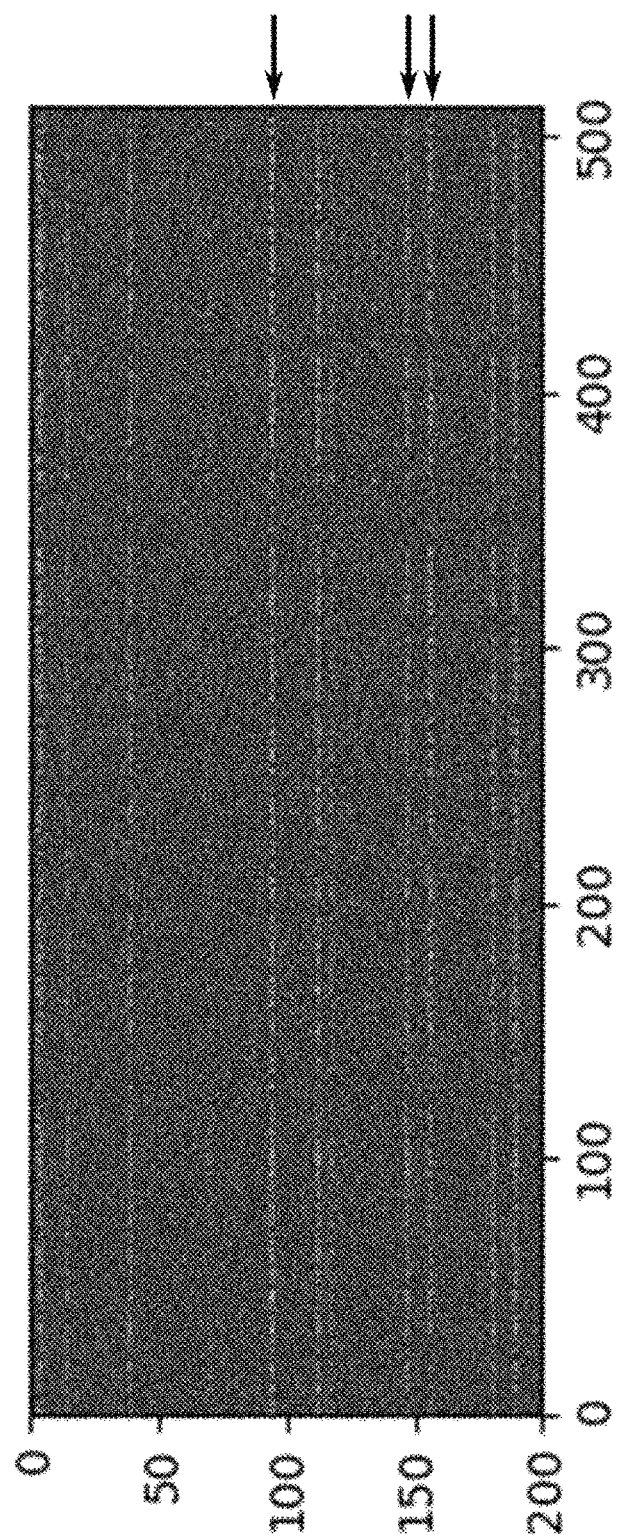
FIG. 18 is an enlarged view of the analysis data in E of FIG. 17.

On the other hand, in analysis data based on the feature map generated in the hierarchy 432 of the feature extraction layer 412, as illustrated in A to E of FIG. 17, even if the learning processing proceeds, horizontal lines do not disappear and remain. In other words, it has been found that learning is not appropriately performed in the feature extraction layer 412 and a feature of the millimeter wave image is not appropriately extracted. Note that analysis data in A to E of FIG. 17 is arranged in learning progress order, similarly to A to E of FIG. 11. FIG. 18 is an enlarged view of the analysis data in E of FIG. 17.

Therefore, in order to investigate a cause of appearance of the horizontal lines in the analysis data, the captured images and the millimeter wave images corresponding to rows in which the horizontal lines appear have been examined.

Figure 19:
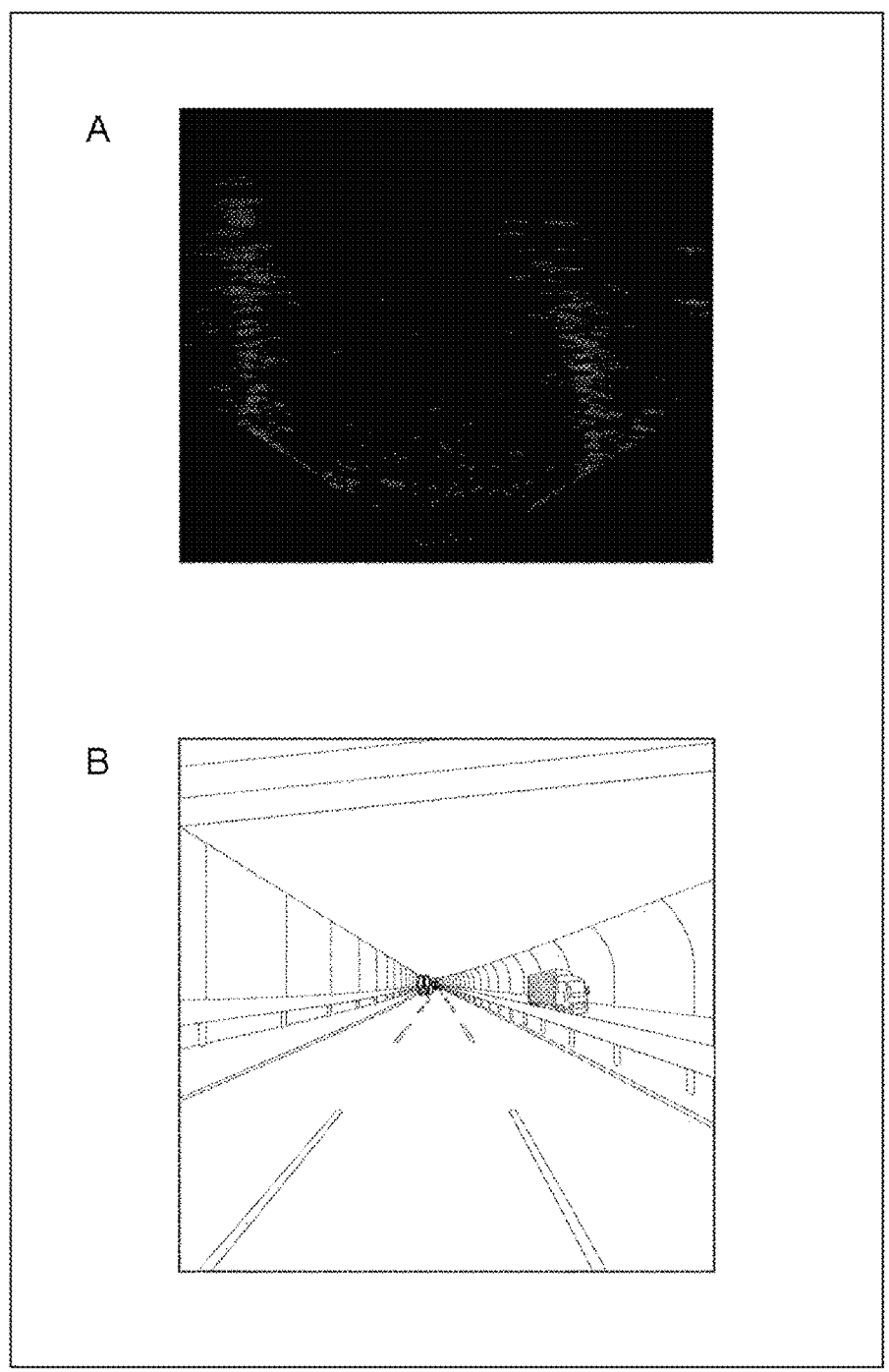
FIG. 19 is a diagram illustrating a first example of a millimeter wave image and a captured image.
Figure 20:
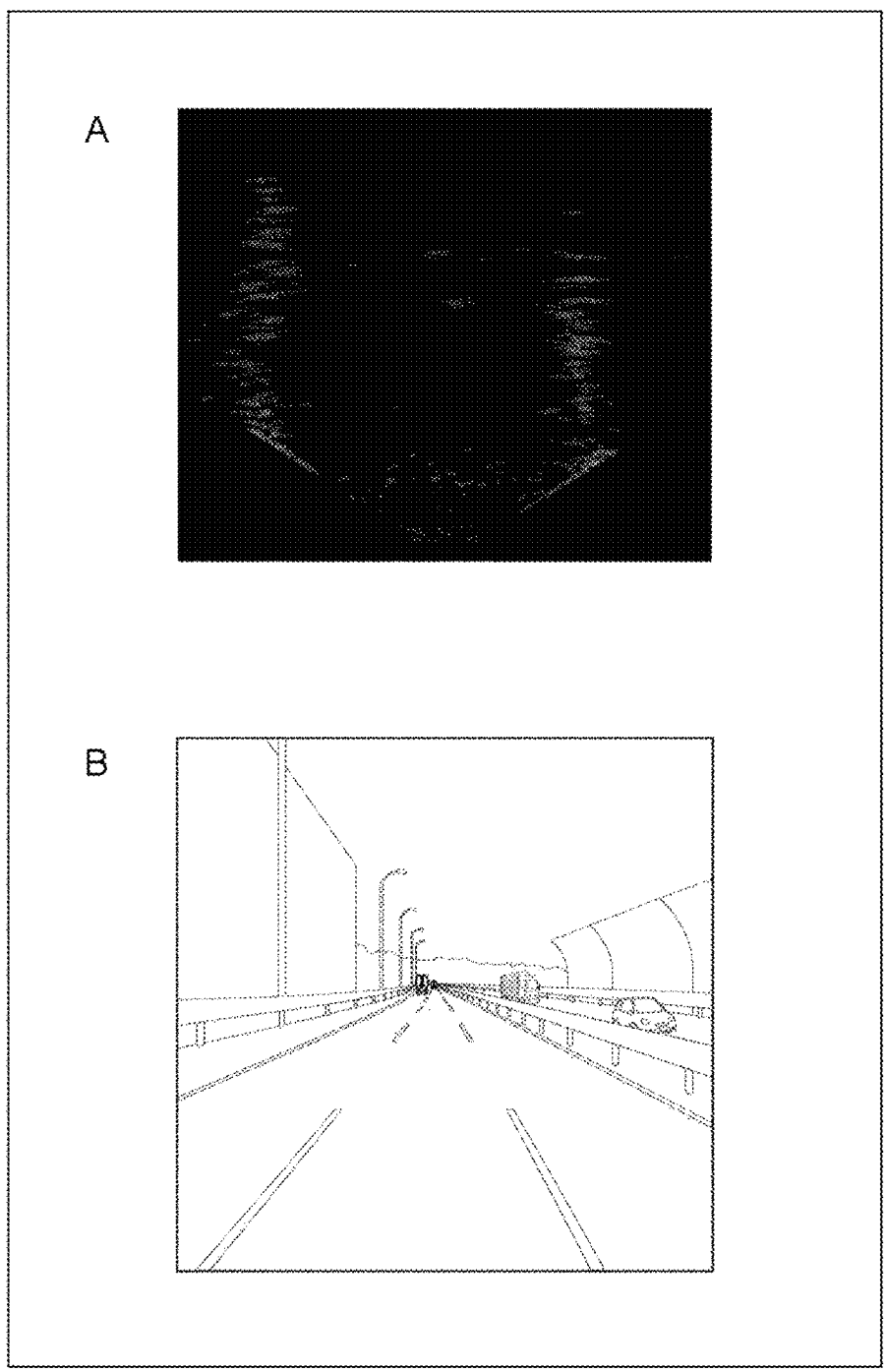
FIG. 20 is a diagram illustrating a second example of the millimeter wave image and the captured image.
Figure 21:
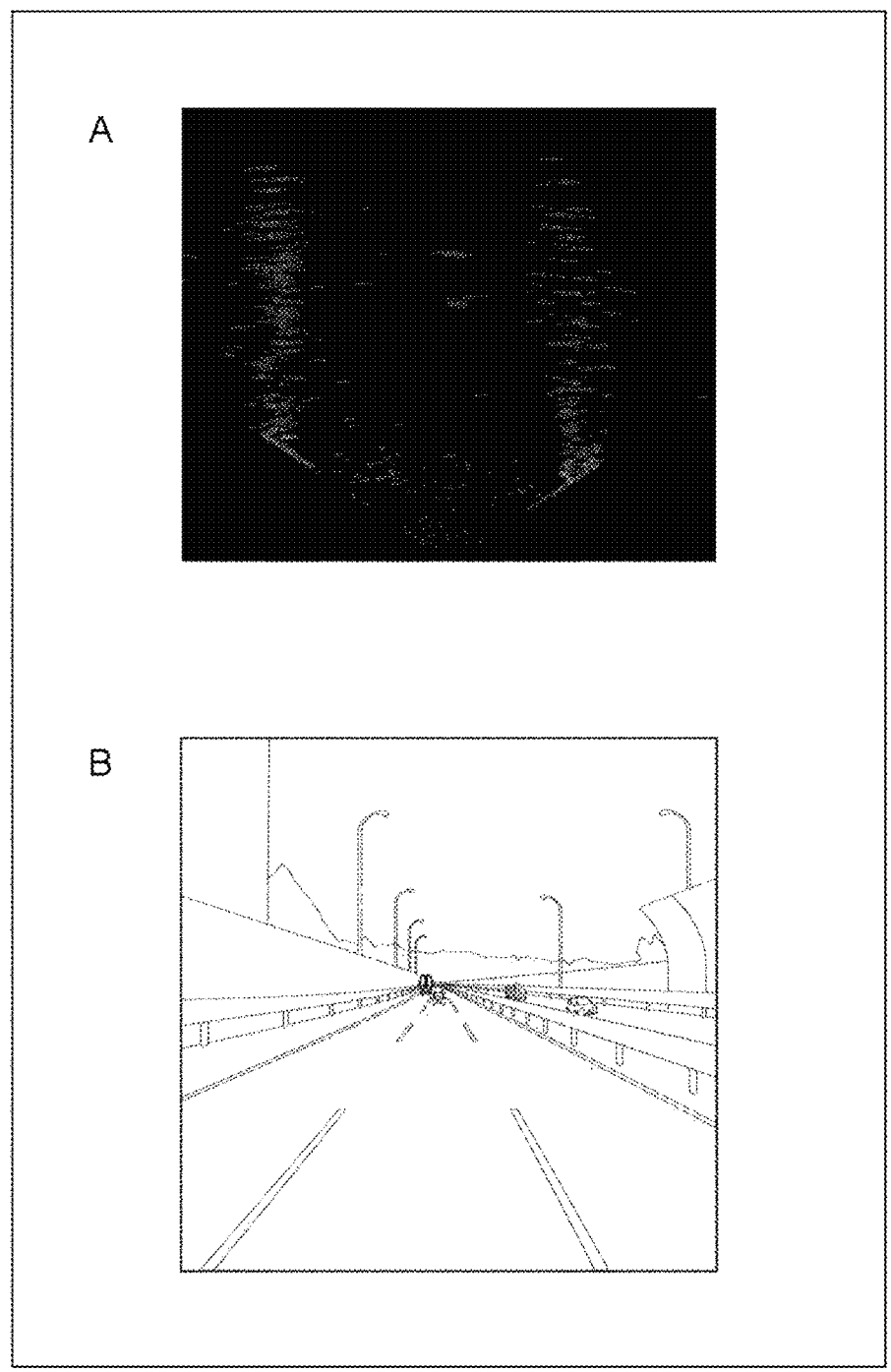
FIG. 21 is a diagram illustrating a third example of the millimeter wave image and the captured image.

FIGS. 19 to 21 each schematically illustrate a millimeter wave image and a captured image corresponding to a row indicated by an arrow in FIG. 18 in which the horizontal line of the analysis data appears. A of FIGS. 19 to 21 illustrates the millimeter wave image converted into a grayscale image, and B of FIGS. 19 to 21 illustrates the captured image as a diagram.

Then, as illustrated in examples of the captured images in A of FIGS. 19 to 21, it has been found that the vehicle 10 travels in a center lane of a highway in all the rows in which the horizontal lines of the analysis data appear.

Figure 22:
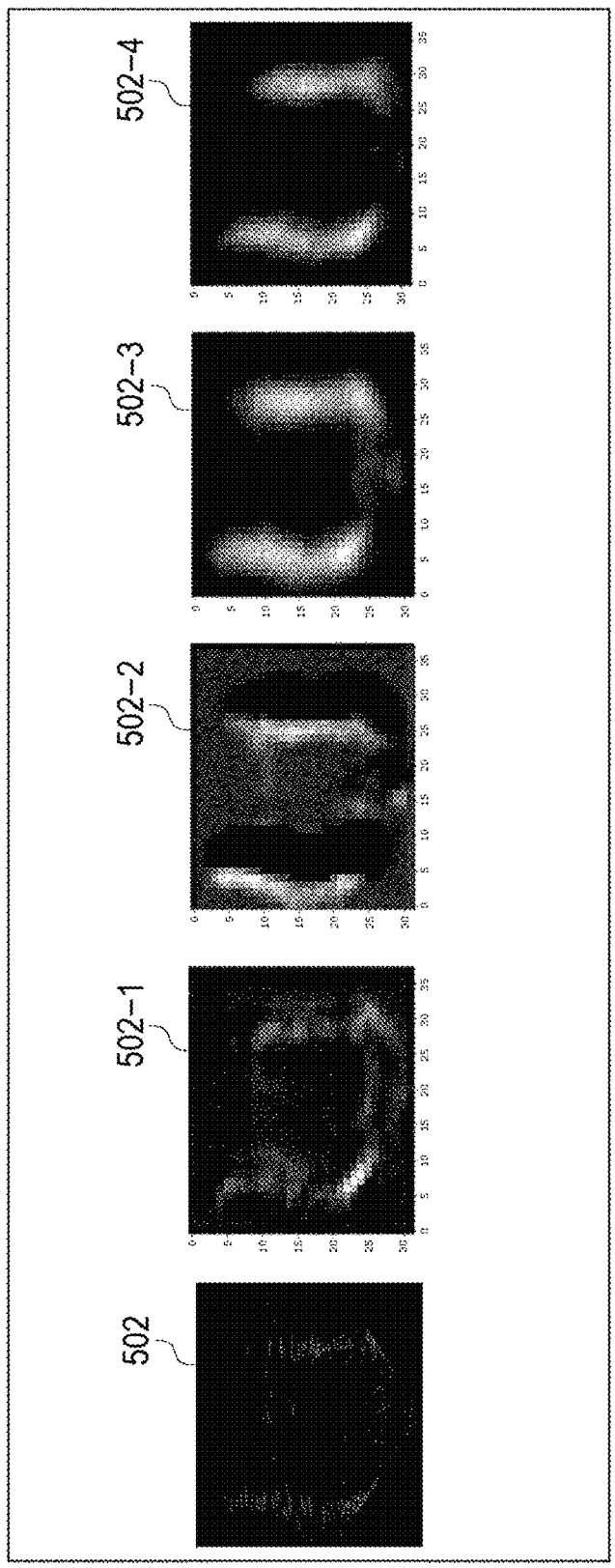
FIG. 22 is a diagram illustrating an example of feature maps generated from a millimeter wave image.

Furthermore, FIG. 22 illustrates an example of feature maps of rows in which horizontal lines of analysis data appear. A millimeter wave image 501 is obtained by converting a millimeter wave image of rows in which horizontal lines of analysis data appear into a grayscale image, and feature maps 502-1 to 502-4 are some of feature maps generated from the millimeter wave image 501.

In the feature maps 502-1 to 502-4, pixel values greatly change near left and right ends in front of the vehicle 10. Therefore, it can be seen that, in the feature maps generated from the millimeter wave image, features corresponding to not the vehicle in front of the vehicle 10 but left and right walls and the like in front of the vehicle are easily extracted.

Therefore, it has been found that there is a possibility that the feature extraction layer 412 is more suitable for recognizing the left and right walls and the like than the vehicle in front of the vehicle 10.

As described above, by using the analysis data, it is possible to easily specify the cause of the failure of the object recognition model 401 in recognizing the vehicle.

3. Modified Examples

Hereinafter, modified examples of the above-described embodiments of the present technology will be described.

Feature data used for analysis data is not limited to the variance of the pixel values of the feature map described above, and other numerical values representing the features of the feature map can be used.

For example, an average value, a maximum value, a median value, and the like of the pixel values of the feature map can be used for the feature data.

Furthermore, for example, a norm of the feature map calculated by the following formula (3) may be used for the feature data.

[Mathematical formula 2]

$$\text{norm} = \sqrt[m]{\frac{1}{I \times J} \sum_{i=0}^{I} \sum_{j=0}^{J} |A_{i,j} - \text{mean}|^n} \quad (3)$$

norm in the formula (3) indicates the norm of the feature map. n and m represent arbitrary numbers. Other symbols are similar to those in the above-described formula (1).

The norm of the feature map increases as a degree of dispersion of pixel values of pixels with respect to an average value of the pixel values of the feature map increases, and decreases as the degree of dispersion of the pixel values of the pixels with respect to the average value of the pixel values of the feature map decreases. Therefore, the norm of the feature map indicates the degree of dispersion of the pixel values of the feature map.

Moreover, for example, a frequency distribution of the pixel values of the feature map may be used for the feature data.

Figure 23:
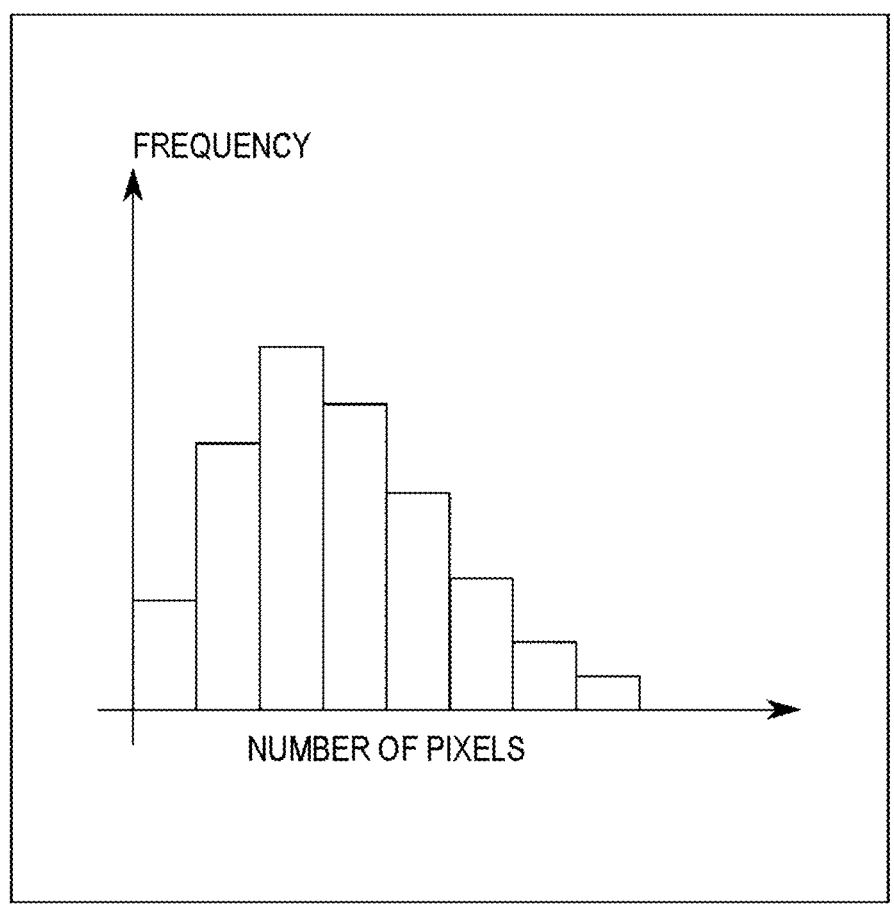
FIG. 23 is a graph illustrating an example of a histogram of pixel values of a feature map.

FIG. 23 illustrates an example of a histogram (frequency distribution) of the pixel values of the feature map. A horizontal axis indicates a grade based on the pixel values of the feature map. In other words, the pixel values of the feature map are classified into a plurality of grades. A vertical axis indicates a frequency. In other words, the number of pixels of the feature map whose pixel values belong to each grade is indicated.

Figure 24:
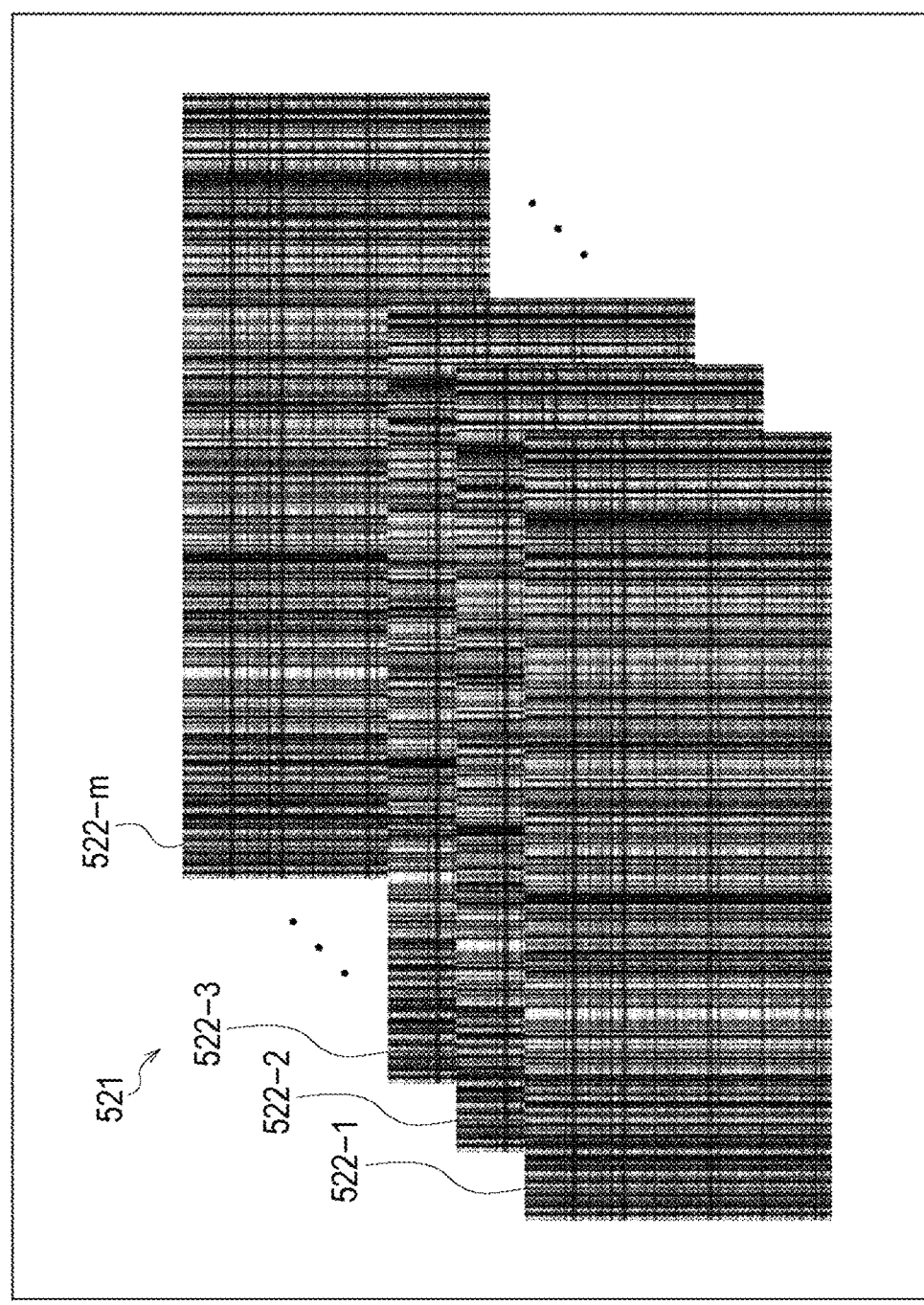
FIG. 24 is a diagram illustrating an example of analysis data based on frequency distribution of pixel values of a feature map.

Then, analysis data illustrated in FIG. 24 is generated on the basis of a plurality of feature maps generated from a plurality of input images (for example, the captured image, the millimeter wave image, and the like described above).

Analysis data 521 in FIG. 24 is three-dimensional data in which two-dimensional frequency maps 522-1 to 522-m generated for each grade of the histogram are arranged in a z-axis direction (a depth direction).

Specifically, an x-axis direction (a horizontal direction) of the frequency map 522-1 indicates a feature map number, and a y-axis direction thereof indicates an input image number.

In the frequency map 522-1, frequencies of a first grade of the histogram of the feature map of each input image are arranged in the x-axis direction (horizontal direction) in numerical order of the corresponding feature maps. Furthermore, frequencies corresponding to the feature maps of the same number of different input images are arranged in the y-axis direction (vertical direction) in numerical order of the corresponding input images.

Similarly, in the frequency maps 522-2 to 522-m, frequencies of an i-th (i=2 to m) grade of the histogram of the feature map of each captured image are arranged in the x-axis direction and the y-axis direction.

The frequency maps 522-1 to 522-m can be used for analysis of a learning situation on the basis of vertical lines and horizontal lines, for example, similarly to the two-dimensional analysis data described above. Furthermore, for example, the analysis data 521 can be used for the analysis of the learning situation on the basis of lines in the z-axis direction.

Furthermore, for example, only feature data satisfying a predetermined condition may be extracted from among feature data based on a plurality of feature maps generated from one or more image data, and analysis data including the extracted feature data may be generated. For example, in a case where the feature data is variance of pixel values of a feature map, feature data having a value equal to or greater than a predetermined threshold value may be extracted from among feature data based on a plurality of feature maps generated from one image data, and analysis data including the extracted feature data may be generated. In this case, the analysis data includes only feature data (=variance of pixel values) of a feature map having variance of pixel values equal to or greater than the predetermined threshold value.

Moreover, for example, analysis data may be generated on the basis of a plurality of feature maps generated for one or more image data in different hierarchies of a neural network.

For example, three-dimensional analysis data may be generated by laminating, in the z-axis direction, data for each hierarchy obtained by two-dimensionally arraying feature data of the feature map generated in each hierarchy in the x-axis direction and the y-axis direction. In other words, in this analysis data, feature data of feature maps generated in the same hierarchy is arranged in the x-axis direction and the y-axis direction, and feature data of feature maps generated in different hierarchies is arranged in the z-axis direction.

Furthermore, in the above description, an example has been described in which the analysis processing of the learning situation is performed in parallel with the learning processing. However, for example, the analysis processing of the learning situation can be performed after the end of the learning processing. For example, feature maps generated during the learning processing may be accumulated, and the analysis data may be generated on the basis of the feature maps accumulated after the learning processing to analyze the learning situation.

Moreover, the learning model to be analyzed in the learning processing is not limited to the above-described example, and can be a general learning model using a neural network. For example, a recognition model that recognizes an object other than the vehicle and a recognition model that recognizes a plurality of objects including the vehicle are also targets. Furthermore, a learning model whose input data is other than image data is also a target. For example, a voice recognition model using voice data as the input data, a sentence analysis model using sentence data as the input data, and the like are also targets.

4. Others

<Configuration Example of Computer>

The series of processing described above can be executed by hardware or software. In a case where the series of processing is executed by the software, a program constituting the software is installed on a computer. Here, the computer includes a computer incorporated in dedicated hardware, a general-purpose personal computer capable of executing various functions by installing various programs, and the like, for example.

FIG. 25 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, for example, the CPU 1001 loads a program recorded in the recording unit 1008 into the RAM 1003 via the input/output interface 1005 and the bus 1004 and executes the program, whereby the above-described series of processing is performed.

The program executed by the computer 1000 (CPU 1001) can be provided by recording on the removable medium 1011 as a package medium and the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via the wired or wireless transmission medium and installed in the recording unit 1008. In addition, the program can be installed in the ROM 1002 or the recording unit 1008 in advance.

Note that the program executed by the computer may be a program in which processing is performed in time series in the order described in the present specification, or may be a program in which processing is performed in parallel or at necessary timing such as when a call is made, and the like.

Furthermore, in the present specification, the system means a set of a plurality of components (devices, modules (parts), and the like), and it does not matter whether or not all the components are in the same housing. Therefore, a plurality of devices housed in separate housings and connected via a network, and one device housing a plurality of modules in one housing are both systems.

Moreover, embodiments of the present technology are not limited to the above-described embodiments, and various modifications can be made without departing from the scope of the present technology.

For example, the present technology can be configured as cloud computing in which one function is shared and jointly processed by a plurality of devices via a network.

Furthermore, each step described in the above-described flowcharts can be executed by one device or shared and executed by a plurality of devices.

Moreover, in a case where one step includes a plurality of processing, the plurality of processing included in the one step can be executed by one device or shared and executed by a plurality of devices.

<Combination Example of Configurations>

The present technology can have the following configurations.

(1)

An information processing method including:

a feature data generation step of generating feature data that numerically represents a feature of a feature map generated from input data in a model using a neural network; and an analysis data generation step of generating analysis data based on the feature data of a plurality of the feature maps.

(2)

The information processing method according to (1), in which the feature data of a plurality of the feature maps is arranged in the analysis data.

(3)

The information processing method according to (2), in which in the analysis data, the feature data of a plurality of the feature maps generated from a plurality of the input data is arranged in a predetermined hierarchy of the model that generates a plurality of the feature maps from one of the input data.

(4)

The information processing method according to (3), in which the feature data of a plurality of the feature maps generated from the same input data is arranged in a first direction of the analysis data, and the feature data of the feature maps corresponding to each other of the different input data is arranged in a second direction orthogonal to the first direction.

(5)
The information processing method according to (4), in which the feature data indicates a degree of dispersion of pixel values of the feature map.

(6)
The information processing method according to (5), further including:
an analysis step of analyzing a learning situation of the model on the basis of a line in the first direction and a line in the second direction of the analysis data.

(7)
The information processing method according to (6), further including:
a parameter setting step of setting a parameter for learning of the model on the basis of an analysis result of the learning situation of the model.

(8)
The information processing method according to (7), in which in the parameter setting step, a regularization parameter for learning of the model is set on the basis of the number of lines in the second direction of the analysis data.

(9)
The information processing method according to (3), in which the feature data indicates a frequency distribution of pixel values of the feature map, and
in the analysis data, the feature data of a plurality of the feature maps generated from a plurality of the input data is three-dimensionally arranged in the hierarchy of the model.

(10)
The information processing method according to any one of (1) to (9),
in which the input data is image data, and
the model performs recognition processing of an object.

(11)
The information processing method according to (10), in which the model performs recognition processing of a vehicle.

(12)
The information processing method according to (11), in which the input data is image data representing a distribution of intensity of a received signal of a millimeter wave radar in a bird's-eye view.

(13)
The information processing method according to (12), in which the model converts the image data into an image in a camera coordinate system.

(14)
The information processing method according to (1), in which the analysis data includes the feature data satisfying a predetermined condition among the feature data of a plurality of the feature maps.

(15)
A program that causes a computer to execute processing including:
a feature data generation step of generating feature data that numerically represents a feature of a feature map generated from input data in a model using a neural network; and
an analysis data generation step of generating analysis data in which the feature data of a plurality of the feature maps is arranged.

(16)
An information processing apparatus including:
a feature data generation unit that generates feature data that numerically represents a feature of a feature map generated from input data in a model using a neural network; and
an analysis data generation unit that generates analysis data in which the feature data of a plurality of the feature maps is arranged.

Note that the effects described in the present specification are merely examples and are not limited, and there may be other effects.

REFERENCE SIGNS LIST

10 Vehicle
100 Vehicle control system
141 Vehicle exterior information detection unit
201 Object recognition model
211 Feature extraction layer
221 Hierarchy
301 Information processing apparatus
312 Learning unit
313 Learning situation analysis unit
321 Feature data generation unit
322 Analysis data generation unit
323 Analysis unit
324 Parameter setting unit
401 Object recognition model
411, 412 Feature extraction layer
421 Camera network
422 Millimeter wave radar network
423 Combining network
431, 432 Hierarchy

The invention claimed is:

1. An information processing method executed by processing circuitry, the method comprising:
generating feature data that numerically represents a feature of a feature map generated from input data in a model using a neural network;
generating analysis data based on the feature data of a plurality of feature maps; and
displaying the generated analysis data as feature data, based on feature maps generated from a same input data, arranged in numerical order of the feature maps in a first axis direction and feature data, based on feature maps corresponding to different input data, arranged in numerical order of the different input data in a second axis direction orthogonal to the first axis direction, wherein the generated analysis data is displayed as an image in which pixels represent values of the feature data of a given input data and a given feature map, and the image is indicative of a state of learning of the model using the neural network.

2. The information processing method according to claim 1,
wherein in the analysis data, the feature data of a plurality of the feature maps generated from a plurality of the input data is arranged in a predetermined hierarchy of the model that generates a plurality of the feature maps from one of the input data.

3. The information processing method according to claim 1,
wherein the feature data indicates a degree of dispersion of pixel values of the feature map.

4. The information processing method according to claim 3, further comprising:
   analyzing a learning situation of the model on a basis of a line in the first direction and a line in the second direction of the analysis data.

5. The information processing method according to claim 4, further comprising:
   setting a parameter for learning of the model on a basis of an analysis result of the learning situation of the model.

6. The information processing method according to claim 5,
   wherein in the parameter setting, a regularization parameter for learning of the model is set on a basis of the number of lines in the second direction of the analysis data.

7. The information processing method according to claim 2,
   wherein the feature data indicates a frequency distribution of pixel values of the feature map, and
   in the analysis data, the feature data of a plurality of the feature maps generated from a plurality of the input data is three-dimensionally arranged in the hierarchy of the model.

8. The information processing method according to claim 1,
   wherein the input data is image data, and
   the model performs recognition processing of an object.

9. The information processing method according to claim 8,
   wherein the model performs recognition processing of a vehicle.

10. The information processing method according to claim 9,
    wherein the input data is image data representing a distribution of intensity of a received signal of a millimeter wave radar in a bird's-eye view.

11. The information processing method according to claim 10,
    wherein the model converts the image data into an image in a camera coordinate system.

12. The information processing method according to claim 1,
    wherein the analysis data includes the feature data satisfying a predetermined condition among the feature data of a plurality of the feature maps.

13. A non-transitory computer readable medium storing instructions that, when executed by processing circuitry, perform an information processing method comprising:
    generating feature data that numerically represents a feature of a feature map generated from input data in a model using a neural network;
    generating analysis data based on the feature data of a plurality of feature maps; and
    displaying the generated analysis data as feature data, based on feature maps generated from a same input data, arranged in numerical order of the feature maps in a first axis direction and feature data, based on feature maps corresponding to different input data, arranged in numerical order of the different input data in a second axis direction orthogonal to the first axis direction, wherein the generated analysis data is displayed as an image in which pixels represent values of the feature data of a given input data and a given feature map, and the image is indicative of a state of learning of the model using the neural network.

14. An information processing apparatus comprising:
    processing circuitry configured to:
    generate feature data that numerically represents a feature of a feature map generated from input data in a model using a neural network;
    generate analysis data based on the feature data of a plurality of feature maps; and
    display the generated analysis data as feature data, based on feature maps generated from a same input data, arranged in numerical order of the feature maps in a first axis direction and feature data, based on feature maps corresponding to different input data, arranged in numerical order of the different input data in a second axis direction orthogonal to the first axis direction, wherein the generated analysis data is displayed as an image in which pixels represent values of the feature data of a given input data and a given feature map, and the image is indicative of a state of learning of the model using the neural network.

* * * * *